(12) United States Patent
Kramer

(10) Patent No.: US 8,991,129 B1
(45) Date of Patent: Mar. 31, 2015

(54) TILE AND TILE ASSEMBLY FOR A ROOF

(71) Applicant: Kurt Joseph Kramer, Claremont, CA (US)

(72) Inventor: Kurt Joseph Kramer, Claremont, CA (US)

(*) Notice: Subject to any disclaimer, the term of this patent is extended or adjusted under 35 U.S.C. 154(b) by 0 days.

(21) Appl. No.: 14/201,907

(22) Filed: Mar. 9, 2014

Related U.S. Application Data

(60) Provisional application No. 61/776,726, filed on Mar. 11, 2013.

(51) Int. Cl.
  *E04D 1/00* (2006.01)
  *E04D 1/02* (2006.01)
  *H01L 31/048* (2014.01)

(52) U.S. Cl.
  CPC ............ *E04D 1/025* (2013.01); *H01L 31/0483* (2013.01)
  USPC .................................. 52/554; 52/519; 52/535

(58) Field of Classification Search
  USPC ..................... 52/519, 535, 553, 554
  See application file for complete search history.

(56) References Cited

U.S. PATENT DOCUMENTS

| | | | | |
|---|---|---|---|---|
| 202,953 A * | 4/1878 | Merrill | ............................ | 52/542 |
| 263,535 A | 9/1882 | Atterbury | | |
| 267,904 A * | 11/1882 | Lane | ............................ | 52/536 |
| 292,585 A * | 1/1884 | Repp | ............................ | 52/519 |
| 407,535 A * | 7/1889 | Klehe | ............................ | 52/533 |
| 558,395 A | 4/1896 | Krebs | | |
| 1,101,591 A * | 6/1914 | Vogan | ............................ | 52/521 |
| 1,203,598 A * | 11/1916 | Ford | ............................ | 52/555 |
| 1,335,756 A | 4/1920 | Scarff | | |
| 1,491,798 A * | 4/1924 | Harshberger | ............................ | 52/535 |
| 1,516,696 A * | 11/1924 | Bacot | ............................ | 52/537 |
| 1,570,516 A * | 1/1926 | Miller | ............................ | 52/530 |
| RE17,133 E | 11/1928 | Lietz | | |
| 1,729,212 A * | 9/1929 | Fischer | ............................ | 52/555 |
| 1,824,471 A * | 9/1931 | Fischer | ............................ | 52/554 |
| 1,844,961 A * | 2/1932 | Kramer | ............................ | 52/82 |
| 2,093,261 A | 9/1937 | Willson | | |
| 2,133,363 A * | 10/1938 | Talmage | ............................ | 52/521 |
| 2,164,636 A * | 7/1939 | Black | ............................ | 52/545 |
| 2,167,192 A | 7/1939 | Weber | | |
| 2,248,336 A | 7/1941 | Bussey | | |
| 2,505,343 A * | 4/1950 | Stolz | ............................ | 52/557 |
| 2,598,497 A | 5/1952 | Brown et al. | | |
| 2,808,010 A * | 10/1957 | Rannikko | ............................ | 52/554 |

(Continued)

FOREIGN PATENT DOCUMENTS

| | | |
|---|---|---|
| BE | 420462 A | 4/1937 |
| CN | 200780024276.1 B2 | 1/2012 |

(Continued)

*Primary Examiner* — Adriana Figueroa

(57) ABSTRACT

A tile assembly having a plurality of tiles adapted to join in an interlocking and repeating fashion. A plurality of tile assemblies are joined to each other, forming a roof with a streamlined look. Each tile assembly includes left and right center tiles laterally spaced along matching edges. The tile assembly includes upper and lower tiles of the same configuration as the center tiles, fitting over and under, respectively, the center tiles. Each tile has repeating patterns laterally spaced to each other and contiguous along matching lateral extents. Each pattern consists of a generally diamond shaped main surface with vertically spaced apices and laterally spaced apices. Two upper flanges extend upwardly and outwardly each pattern's main surface, along the upper edges, joining in an upper flange apex. Two lower flanges extend downwardly and outwardly from each pattern's main surface, along the lower edges, joining in a lower flange apex.

24 Claims, 16 Drawing Sheets

(56) References Cited

U.S. PATENT DOCUMENTS

| | | | |
|---|---|---|---|
| 2,882,840 A | 4/1959 | Waske | |
| 3,203,144 A * | 8/1965 | Fuller | 52/81.4 |
| 3,209,506 A | 10/1965 | Waske | |
| 3,371,457 A * | 3/1968 | Wienand | 52/404.4 |
| 3,394,506 A * | 7/1968 | Thompson | 52/13 |
| 3,439,459 A | 4/1969 | Silberkuhl | |
| 3,874,141 A * | 4/1975 | Olson et al. | 52/630 |
| 3,893,277 A | 7/1975 | Constant | |
| 4,691,492 A * | 9/1987 | Kane | 52/519 |
| 4,720,955 A * | 1/1988 | Kane | 52/519 |
| 4,821,471 A | 4/1989 | Stephens et al. | |
| 5,442,888 A | 8/1995 | Ilnyckyj | |
| 5,590,495 A | 1/1997 | Bressler et al. | |
| 5,613,337 A * | 3/1997 | Plath et al. | 52/533 |
| 5,711,127 A * | 1/1998 | Sabourin | 52/530 |
| RE38,210 E * | 8/2003 | Plath et al. | 52/533 |
| 7,493,734 B2 | 2/2009 | Kramer | |
| 7,975,450 B2 | 7/2011 | Kramer | |
| 2004/0123544 A1 * | 7/2004 | Simmons et al. | 52/519 |

FOREIGN PATENT DOCUMENTS

| | | |
|---|---|---|
| DE | 89924 C | 9/1894 |
| EP | 2013426 B1 | 1/2012 |
| GB | 631458 A | 11/1949 |
| WO | 9413904 A1 | 6/1994 |

* cited by examiner

SECTION B-B

SECTION C-C

SECTION D-D

SECTION E-E

TILE AND TILE ASSEMBLY FOR A ROOF

RELATED APPLICATIONS

Continuity type: claims benefit of Provisional, Application No. 61/776,726, filed on Mar. 11, 2013

BACKGROUND OF THE INVENTION (1) Field of the Invention

The present invention relates to roofing tiles.

(2) Description of Related Art

The art of roofing tiles extends back over centuries involving a variety of media, such as fired clay, slate, and wood shingles. In general, tiles can be formed with a variety of shapes. For example, rectangular tiles arranged in overlapping rows are a common roofing style. Some styles include curves or angles on exposed segments and supporting areas that give the tile a three-dimensional look on a flat roof. These tiles can be formed of fired clay, cement, metal, plastics and composites.

Some tiles are configured with a diamond shape in which the high point to low point axis of the diamond extends in a direction generally perpendicular to the roof line. Diamond shaped tiles involve somewhat more complex arrangements for securing and overlapping the tiles than do straightforward rectangular tiles. One such type of rectangular tile includes a generally diamond shaped flat main surface having upwardly turned flanges along its upper two diamond edges and downwardly turned flanges along its lower two diamond edges. The flanges of this tile extend in a perpendicular relation to the main surface. Considering two vertically spaced upper and lower rows of tiles according to such arrangement, the downwardly facing flanges along the lower edges of the tiles in the upper row hook over the upwardly facing flanges along the upper edges of the tile in the lower row, and connector pins are driven into the underlying roof or laths through appropriately positioned openings through the tiles.

While tiles of the prior art type, as previously described, are generally satisfactory, certain disadvantages are associated with such a structure. The use of flanges which contact surfaces of different tiles essentially at right angles tends to give a rather "blocky" or abrupt appearance to the assembled groups of tiles rather than a smooth flowing transition. The essentially perpendicular flange relationships would tend to interfere with laminar flow of wind over the roof, which creates eddies and turbulence with increased wind resistance. In general, wind resistance is undesirable in a roofing system due to increases in wind noise and, in severe wind conditions over time, can contribute to the earlier loosening of tiles and reduction of roof life. Reducing the wind resistance of a tile system and providing a good means of attachment to the roof deck provide better protection from high winds. Reducing wind resistance herein has the same meaning as increasing resistance to wind effects.

In addition, this prior art type of tile fails to compensate for structural variations of the tiles due to imprecise manufacturing techniques involved in tile making. These structural variations of the tiles can lead to difficulties in fitting tiles together due to interference fits and instances of roofers installing tiles imprecisely on the roof laths such that they are to some degree misaligned. Sometimes, the roof deck may not be perfectly flat which contributes to the alignment problem.

Another problem that can arise with tiles of this character is in connection with water as it falls and runs down the exposed surfaces of the tiles. The effect of wind driven rain can cause water to run under the flanges and flow in the channels defined by the space between an upper flange and a lower flange placed directly over it. While such water movement cannot be entirely avoided, there should be ways to reduce the opportunity for such channeled water to pass through the roof tiles onto the underlying structure.

Labor cost is a significant portion of the total cost of a new roof or roof replacement. A tile which covers more roof space will have faster installation times and lower labor costs associated with it. A tile with multiple, repeating patterns covers more roof than a tile with one pattern, where the patterns are of a similar size.

BRIEF SUMMARY OF THE INVENTION

The present invention relates to roofing tiles intended to provide a repeating, diamond shaped, three-dimensional, streamline impression, having improved resistance to wind effects and capable of accommodating variations in the dimensions or positioning of individual tiles. The present invention further relates to an assembly of roofing tiles for a similar function and purpose.

In one aspect, the tile and tile assembly of the present invention give a roof an attractive repeating diamond pattern with a three-dimensional surface in which the edges of overlapping tiles slope together in a streamline manner. Such a surface is intended to be visually attractive and contribute to a more laminar flow of wind over the roof to thereby reduce wind resistance and provide improved resistance to high wind tile blow off and to thereby avoid excessive noise along with enhancing the life of the roof against loosening from the effects of wind. Moreover, the tile assembly is adapted to accommodate tile imperfections and misalignments during installation and reduce opportunities for leakage of water through the roof. The tiles have a repeating diamond pattern, of at least two patterns per tile. The more patterns the tiles have, the less adjacent tile to tile occurrences of the assembled tiles, reducing the number of potential points of rain ingress which could occur where tiles are side by side. The repeating diamond pattern on the tiles enable faster roof installation times.

In one embodiment, the tile assembly includes a set of four tiles that are adapted to connect in a repeating manner (FIG. 1). A plurality of tile assemblies can be connected to each other in a surrounding manner to provide the roof (FIG. 3). Each four tile assembly includes left and right center tiles, side by side with each other (FIG. 2). The tile assembly includes upper and lower tiles, of the same configuration. Each tile has a laterally repeating pattern of generally diamond shaped main surfaces, each main surface with vertically spaced upper and lower apices and laterally spaced lateral apices. Two upper flanges extend along the upper edges of the main surface of each pattern, extending upwardly and outwardly at an obtuse angle from the main surface and are joined in an upper flange apex. Two lower flanges extend along the lower edges of the main surface of each tile pattern, extending downwardly and outwardly at an obtuse angle and are joined in a lower flange apex. Upper and lower flanges and main surfaces of adjacent patterns are joined at the matching lateral extents of these patterns and may include a transition between patterns. The upper tile fits over the upper flanges of the two center tiles while the lower tile fits beneath the lower flanges of the two center tiles. Lower tiles will sometimes here be described as bottom tiles as they have both a lower placement on the roof and are underneath the other tiles (center tiles and upper tile). Upper tiles will sometimes here be described as top tiles as they have both a higher placement on the roof and are over the other tiles (center tiles and lower tile). On a roof where a tile is surrounded by other tiles, the tile will be a left and right center tile, a lower tile and an upper tile in relation to other tiles around it.

This arrangement provides a tile assembly in which the overlapping tile edges have a streamlined appearance in which the transitions between main surfaces of tiles, which are at different elevations relative to each other, are blended smoothly by the intervening overlapping flanges. Thus, air flowing over relatively lower and higher tile surfaces is encouraged to flow in a more nearly laminar condition over the transitions so that eddies and other turbulence inducing phenomena are reduced.

In another embodiment, at the lateral extents of each tile, the edges of the upper and lower flanges and of the main surface blend together to form an inflection edge extending in a plane perpendicular to the main surface. Each flange has an outer edge parallel to the main surface of the pattern and a transition edge extending from the outer edge to the lateral axis of the pattern main surface. The inflection edge includes the transition edges of the upper and lower flanges, which extend above and below the main surface and the lateral extent of the main surface. The inflection edges reduce the disadvantageous effects of manufacturing variances or slight misalignment on the lath by the installer to be easily fitted together in the installing process.

At the lateral extents of each pattern within each tile, the edges of the upper and lower flanges and of the main surface blend together to form an inflection plane which is perpendicular to the main surface. Patterns within a tile which are laterally spaced next to each other have inflection planes matching along their respective lateral extents, and fabricated so the patterns are contiguous and continuous with a small transition between the inflection edges integrated as needed and appropriate for the manufacturing processes used (FIG. 7A).

To the extent the lower flange apex of the upper tile overlaps and covers the inflection edges of the center tiles, it is difficult for water to enter and pass through the line of intersection of the two abutting edges. Further, under each center tile, the upturned flanges at the upper end of the bottom tile are adapted to serve as a catch basin pan beneath the inflection edges of the two center tiles to collect any water that may pass through. The water can then be directed over the outer surface of the bottom tile through a gap or cutaway space at the lowest point of the inflection edges. In one aspect, the lower flange apex of the upper tile does not necessarily overlap the entire inflection edge intersection of the two center tiles, as at least part of the streamlined lower flanges are directly exposed to rain. Spanning any gap between the abutting adjacent center tile infection edges and redirecting water which has passed through back out onto the main surface, is accomplished through the use of a lower rain gusset (FIGS. 8 A & B). The lower rain gusset fits under the lower portions of the inflection edges of two adjacent center tiles to provide additional protection against the ingress of water through the intersection of the inflection edges. The lower gusset keeps the inflection edges of the center tiles close together and in alignment. To facilitate the redirection of water out from the gusset to the exposed main tile surface, the lower inflection edges are cut away partially at and near the ends. This can be accomplished by rounding the ends of the lower inflection edges. This open area is also useful for tiles which do not use the lower gusset. At each pattern to pattern adjacent lower tile junction, an opening at the bottom of the abutting lower flanges allows water behind the lower flanges to be directed out and over the outer surfaces of tiles.

One further embodiment of the invention resides in a supplemental upper rain gusset which can be used, as an alternative embodiment (FIG. 8 C). The upper rain gusset fits over at least the upper portions of the inflection edges of two adjacent center tiles to provide additional protection against ingress of water through the adjacent inflection edges to the roof and to the tiles below it.

In a further embodiment, at and along the inflection edges of the tiles, a lip and pan arrangement can be added to the two side by side tile inflection edges to limit water passing through the adjacent tiles and to provide a drainage channel (FIG. 7 A, FIG. 7 B and FIG. 17). This lip and pan arrangement can be formed to allow the tiles to snap together during installation. The lip and pan act as a blockage to water falling between the inflection edges and a channel to redirect water in the area to the outer tile surfaces. In some configurations of the lip and pan, additional separation between tiles is needed to accommodate the lip and pan arrangement, and this separation must be matched and added to the transitions between patterns within each tile. In addition, to accommodate the separation, the lower apex tip of the top tile must be rounded to allow for the additional separation between center tiles or the apex will have to be placed lower in relation to the center tiles, and will overlap more.

In still another embodiment, the upper flange of each tile pattern in the infection edge region is notched to accommodate the passage of a fastener so as to simplify the installation of the tiles. One type of fastener is a two headed nail, each having a shaft and a head which extends oppositely in two directions to overlap the upper edges of two adjacent tiles or patterns (FIG. 7 A & FIG. 7 B). When the fastener is driven into place, its head region overlaps and grips the two upper adjacent flanges in the notched regions to hold the flanges and tile in place. The notch, which is oversize in relation to the size of the nail shaft, permits the fastener to have some freedom of installation. This freedom, aided by the infection edge itself which accommodates some misalignment of the adjacent edges of two center tiles, provides for an installation which is forgiving of structural variations in the roof support, manufacturing tolerances of tiles, and accommodates some carelessness on the part of the installer in positioning the fasteners when driving them into the underlying layer or lath. Laths are used for the tile assembly to provide support, less penetrations of the supporting roof structure, and for easier fastening (FIG. 18).

In one aspect, the fasteners may include features, such as a lining underneath the fastener head to absorb shocks and to hold the upper and lower abutting flanges together.

Another embodiment is for a hold down clip which consists of a flexible strip of stiff material that extends between a hold or stop on an upper flange on a left or right center tile and a hold or stop on the roof side of a lower flange on the upper tile to be placed directly above the center tile. The holds on each of these flanges may use various methods of securing the flexible strip in a position such that a force applied to lift the tile(s) from the roof will be distributed from the lower flange (s) of the upper tile to the upper flanges of the tile directly below it (FIGS. 9 A,B & C). Each pattern on a tile may use a means of securing the flexible strip in place on each of its two lower flanges. Each tile may also use the hold downs for all upper flanges of every pattern.

One such embodiment of the hold consists of an extension on the lower flange of an upper tile which is a fold on a sheet metal tile, this extension serving as the means of securing one end of the hold down. The other end of the hold down is a fold on the upper edges of the upper tile with the fold being from part of the upper edge which has been cut and bent in a manner which will provide a fixed stop for the flexible strip in the channel between the two flanges. The flexible strip provides a spring type of action on the tiles to keep them in place. If the flexible strip is secured in the tile system with some of the spring action in force, the hold down serves to keep the tiles from moving. This type of arrangement may be used to make a snap together type of assembly. A fastener assembly may be used to hold the tiles to the roof and act as the hold down clip, and may be the hold on the upper flange(s) of the center tile. The type of hold down can vary as long as both ends of the flexible strip are held to oppose the force of lifting the tiles off the roof. The flexible strip does not have to be absolutely fixed to one of the flanges. For thick tiles, indentations or ledges in the surfaces can serve as the holds which keep the hold down clip in place.

Another embodiment of the hold down clip, one flexible strip may hold the two lower flanges of the upper tile against two upper flanges of two center tiles or patterns, and may be used with a fastener.

In yet another embodiment, a tile can be narrowed, which increases the length of the inflection edge at the lateral extent(s) of one or more patterns (FIG. 10 A). This tile narrowing increases the main surface part of the inflection edge from the minimum, which is one point, made by the lateral corner of the main surface. For two tiles of equal dimensions, narrowing one of the tiles by slicing it parallel to the inflection edge will provide this increased length of the main surface part of the inflection edge(s), which narrows the tile laterally (FIG. 10 B) in comparison to the unsliced tile. Narrowing of tiles can be done on a few tiles on a roof to allow the tiles to fit into a narrower space. Narrowing of tiles can be also employed as a design element enabling all tiles on a roof to have narrowed characteristics. Tile narrowing provides the following three properties for roof tiles. One, narrowing slightly modifies the roof appearance because of the tile alignment. Two, narrowing of tiles improves wind resistance because more of the tip of the bottom flange apex rests on the main surface part of two adjacent tiles or patterns and protruding out over the lower edges of the row of tiles directly below less (in some cases there may be no protruding tip). Any protruding tip can obstruct the smooth flow of air (an obstructing tip is more pronounced for thick tiles as compared to thin tiles, because thick tiles have a relatively larger tip protruding over the row underneath). Three, narrowing reduces the catch basin effectiveness of the bottom tile upper flange apex. A roof of narrowed tiles may still make use of further narrowing some of the tiles to fit tiles into an area. When narrowing tiles to fit into an area, all the tiles aligned vertically to the narrowed tile have to be narrowed also (FIGS. 10 A & B). A flange on the narrowed side of a pattern has upper and lower flanges shorter than flanges on a non-narrowed side, with the upper flanges not extending as far down the roof at the inflection edge, and need more underlying upper flange apex of the bottom tile to make the assembly rainproof as compared to a non-narrowed tile of otherwise the same dimensions FIGS. 11 A,B,C & D and FIGS. 12 A,B,C & D).

At the lower edges where streamline tiles are abutting, imperfectly abutting lower flanges on tiles may allow water to enter and become trapped behind the lower edges. This water can flow by gravity between the channel made by the overlapping lower flange over upper flange, and reach the abutting upper inflection edges of the lower tile at the end of the channel. Each abutting upper inflection edge acts as a dam and redirects water out and over the main surfaces and lower flanges. Some of the water arriving at the abutting upper inflection edges of two center tiles may fall between them instead of out and over the main surface and lower flanges of the center tiles. The upper flange apex of the bottom tile acts as a catch basin for water which may pass through the inflection edges directly above it. The upper flange apex then directs water back out toward the main surface of the bottom tile and onto the outer tile surfaces of tiles lower on the roof (FIGS. 11 A,B,C & D). If the flowing water in the channels between the upper and lower flanges rises to a sufficient degree at the abutting upper flanges, the underlying upper flange apex of the lower tile may not be directly under to act as a catch basin and this water could travel to the under roof, partially defeating the rainproofness of the assembly. Another water flow concern is that water in the catch basin of the bottom tile may not all get directed onto the outer exposed tile system and this water will also be trapped behind the lower edges and travel in the channel down the roof. If some of the trapped water flowing from a number of upper horizontal rows of tiles does not reach the outer exposed surfaces, and gets added to other trapped water in rows below, and the effect of the trapped water is multiplied. To provide a better upper apex catch basin of the bottom/lower tile, alternate embodiments employ methods of lengthening the upper half of the tile in comparison to the lower half to provide additional underlying upper flange apex under the abutting inflection edges of the center tiles (FIGS. 5 and 14 A,B,C & D). Pattern to pattern adjoining lower flanges within a tile are not exposed to rain as are the abutting tile to tile lower edges. The pattern to pattern adjoining upper flanges and main surface within a tile are not susceptible to accumulated channel water passing through them. The more patterns per tile, the lower the number of abutting tiles with exposed lower inflection edges and vulnerable upper inflection edges on the roof, and the more rainproof the tile system will be.

Tile placement, in which rows of tiles overlap each other more, provide an improved lower tile catch basin (FIGS. 13 A,B,C & D). This is at the expense of more tiles per given roof area. Narrowed tiles require more catch basin than non-narrowed tiles (FIGS. 12 A,B,C & D). Thin tiles require more catch basin than thick tiles of the same area (as viewed from above or perpendicular to the main surface.

In an alternate embodiment, a tile may have an end pattern which is modified and not identical to the other pattern(s) on the tile (FIG. 16). The adjacent patterns will match along the inflection edges, but one of the patterns will be different to make it easier for trimming, as in the ends of a horizontal row of tiles, or the modified pattern may be different for aesthetic reasons, but match other tiles otherwise, or the modified pattern may be the start of a different tile array.

In another embodiment, tiles of thicknesses which do not match, as in the case of metal and ceramic tiles, may be used together, with only minor trimming of the upper flanges on some of the thinner (metal) tiles required (FIG. 15).

In a further alternate embodiment, the main surfaces of the tiles may have solar photovoltaic assemblies attached or embedded on it (FIG. 17).

As a result of these features of the present invention, a roof built up of tile assemblies according to the invention provides a visually attractive, diamond shaped pattern having a three dimensional streamline look which is intended to have reduced resistance to wind effects and to be effective in moving rain off the roof with reduced intrusion of water through the roof.

Other features and advantages of the invention will be apparent from the following detailed drawings which illustrate, by way of example, various features of embodiments of the invention.

BRIEF DESCRIPTION OF THE SEVERAL VIEWS OF THE DRAWINGS

FIG. 7 B is an expanded view of FIG. 7 A.

FIG. 8 B is a perspective view of a lower gusset.

FIG. 8 C is a perspective view of an upper gusset positioned so as to overlap the gap between adjacent tiles.

FIG. 9 B is a perspective view of the sectioned tile on the group of tiles.

FIG. 9 C is an expanded view of FIG. 9 B.

FIG. 10 B is a top view of a non-narrowed tile with width dimension for comparison.

FIG. 11 B is a section view of FIG. 11 A.

FIG. 11 C is a perspective view of the section of FIG. 11 A.

FIG. 11 D is an expanded view of FIG. 11 C.

FIG. 12 B a section view of FIG. 12 A.

FIG. 12 C is a perspective view of the section of FIG. 12 A.

FIG. 12 D an expanded view of FIG. 12 C.

FIG. 13 B a section view of FIG. 13 A.

FIG. 13 C is a perspective view of the section of FIG. 13 A.

FIG. 13 D an expanded view of FIG. 13 C.

FIG. 14 B a section view of FIG. 14 A.

FIG. 14 C is a perspective view of the section of FIG. 14 A.

FIG. 14 D an expanded view of FIG. 14 C.

DETAILED DESCRIPTION OF THE INVENTION

Reference will now be made to the drawings wherein like numerals refer to like parts throughout.

Figure 1:
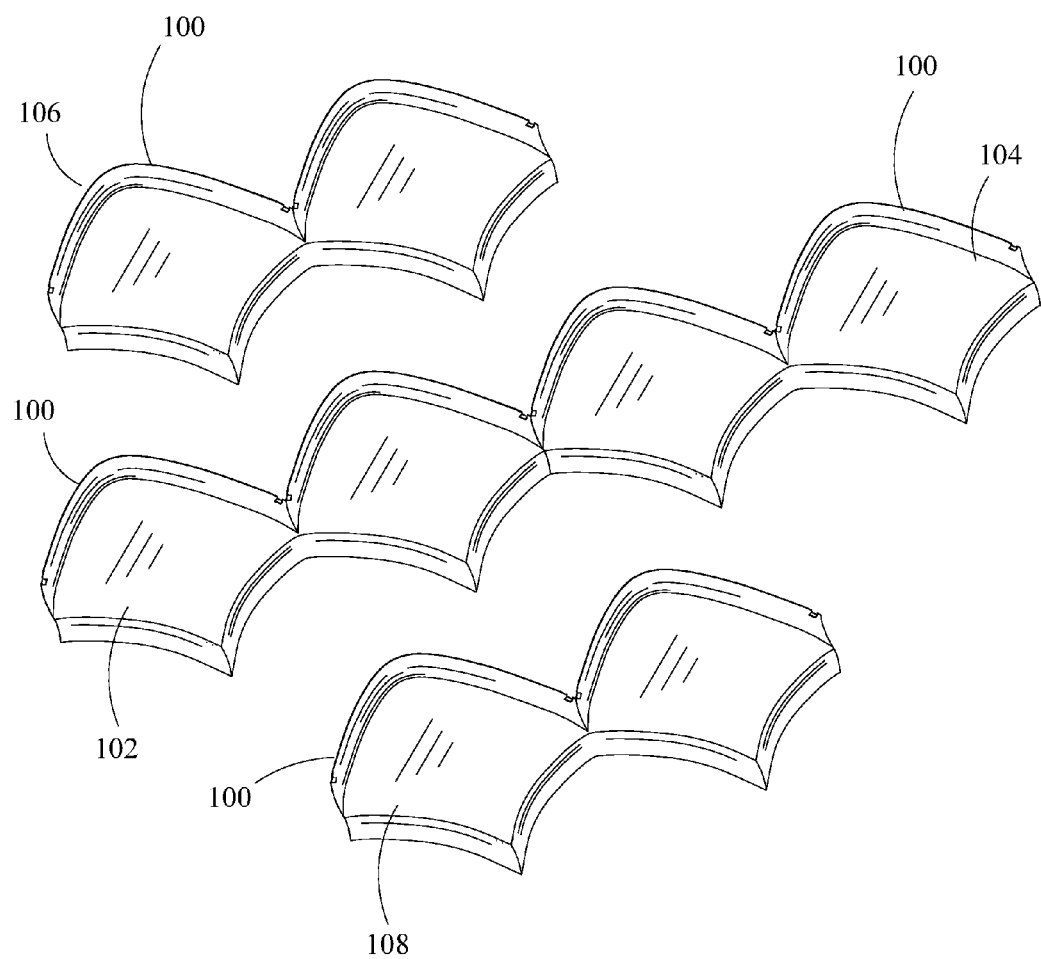
FIG. 1 is a perspective view of a plurality of tiles for assembly.
Figure 2:
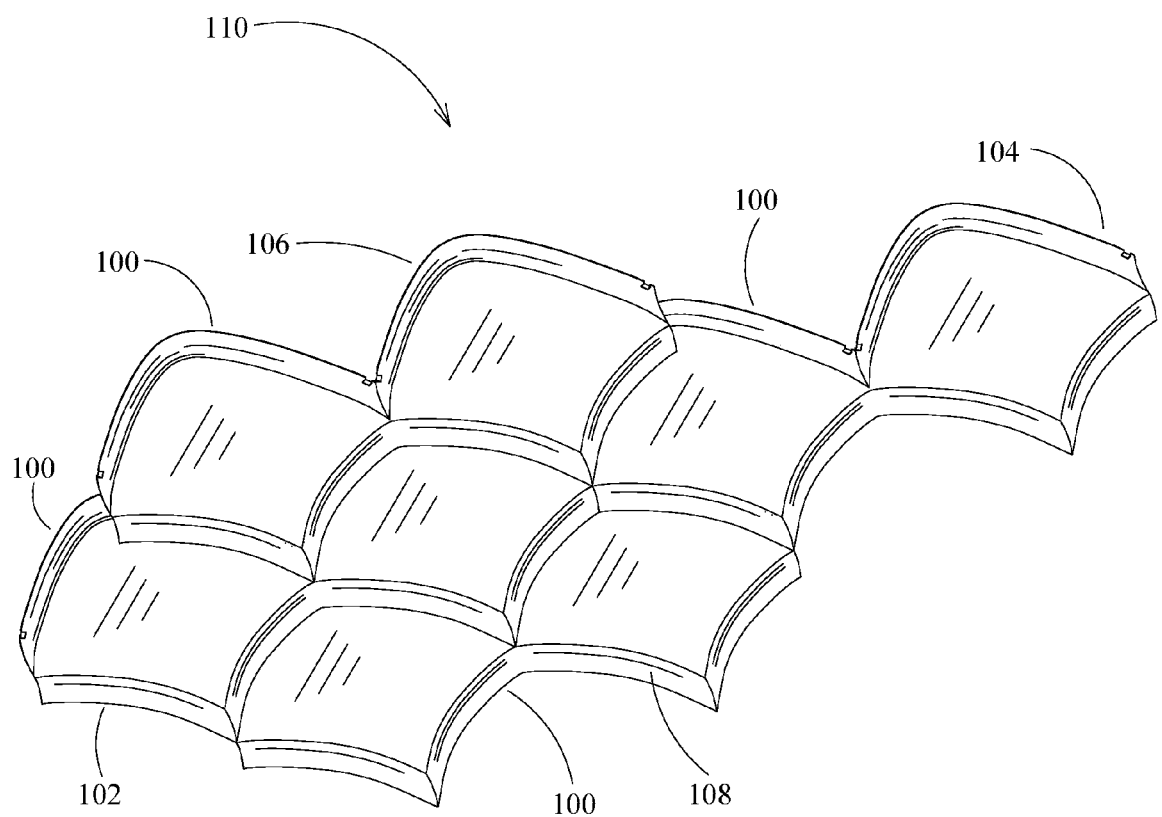
FIG. 2 is a perspective view of a tile assembly.
Figure 3:
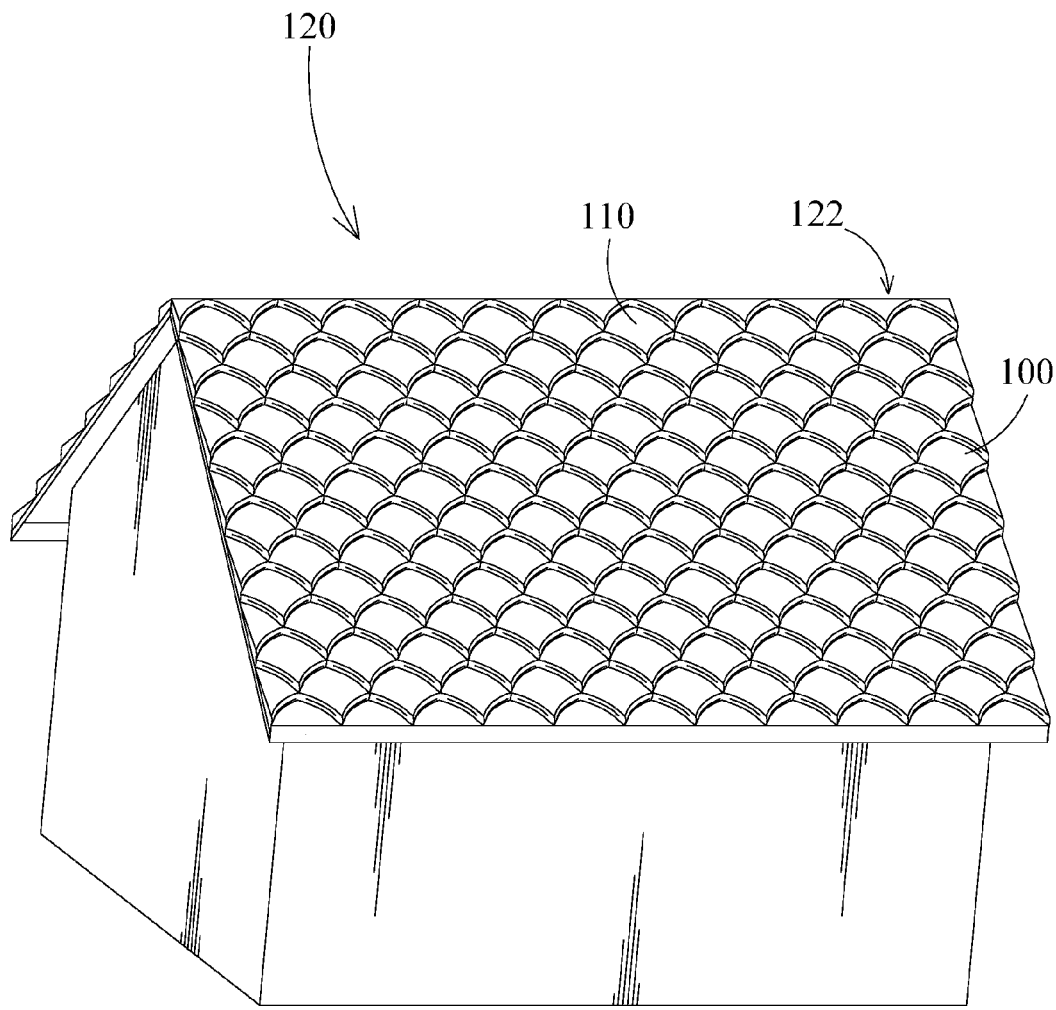
FIG. 3 is a perspective view of a plurality of tiles and tile assemblies linked together with adjacent tile assemblies to form a roof on a structure.
Figure 4:
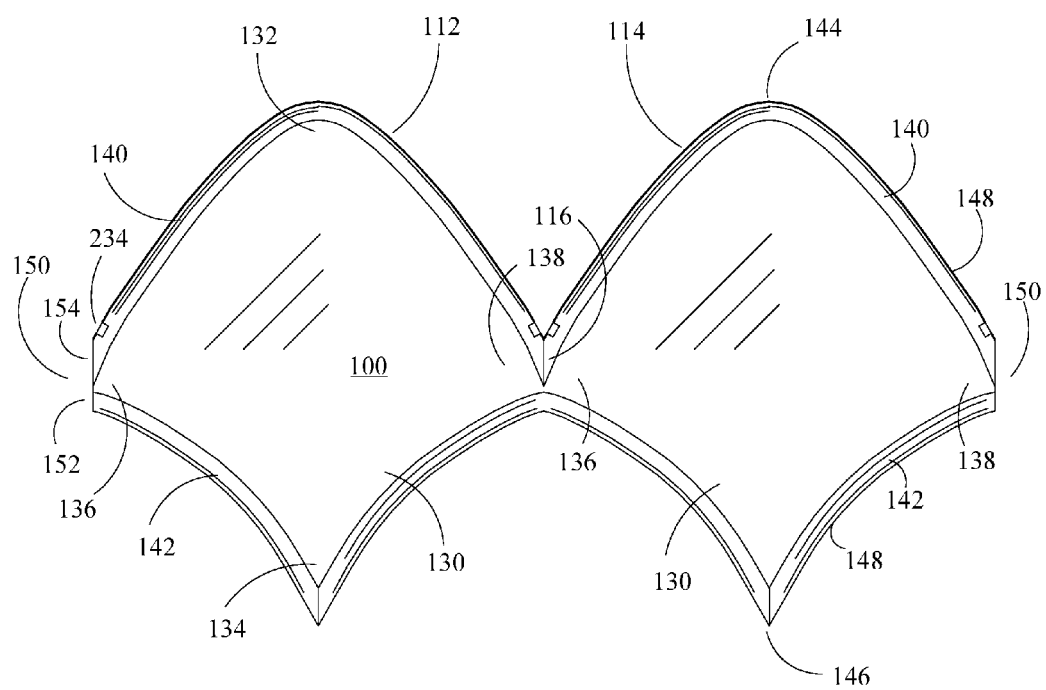
FIG. 4 is a top view of tile.
Figure 5:
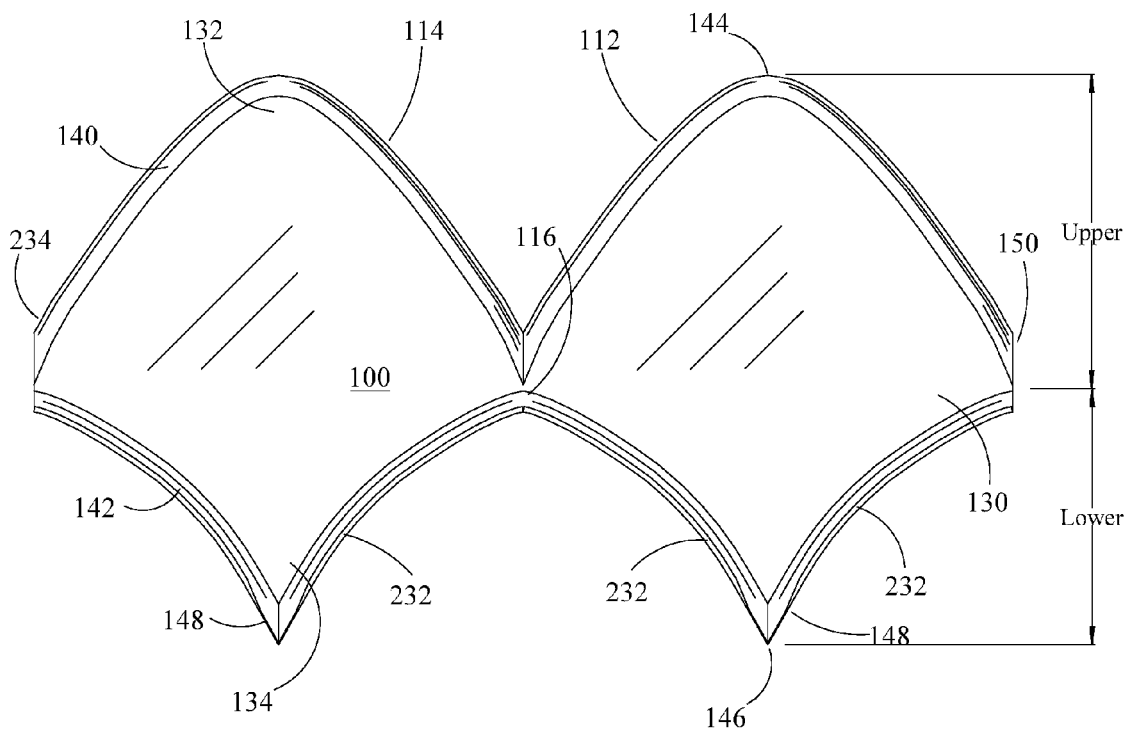
FIG. 5 is a bottom view of tile.
Figure 6:
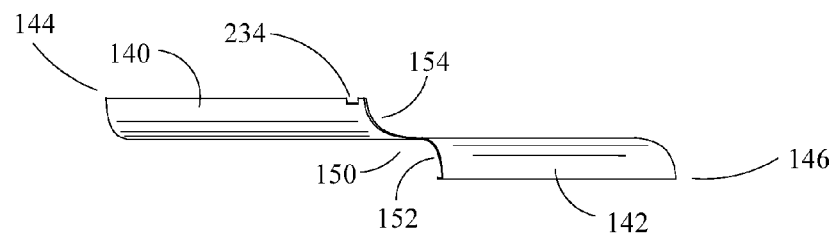
FIG. 6 is a side view of tile.

FIG. 1 illustrates one embodiment of a plurality of diamond patterned tiles 100 for assembly. FIG. 2 illustrates one embodiment of a tile assembly 110 having at least four tiles 100 grouped together in an assembly. FIG. 3 illustrates a plurality of tiles 100 and tile assemblies 110 linked together with adjacent tile assemblies 110 to form a roof 120 of a structure. Roof 120 extends in downwardly inclined planes from either side of a roof line 122. FIG. 4 illustrates a top view of tile 100, FIG. 5 illustrates a bottom view of tile 100 and FIG. 6 illustrates a side view of tile 100. In the following description, a single tile assembly 110 is described, but it will be understood that the flanges of each tile 100 hook over and interlock with the flanges of adjacent tiles 100 in a repeating arrangement of tile assemblies 110 to form roof 120. Each tile 100 has a repeating diamond shape pattern of two or more diamond patterns 112, 114. The illustrations and illustration descriptions here use two diamond patterns 112, 114 per tile 100, but it is understood that the number of diamond patterns is not limited.

Figure 11:
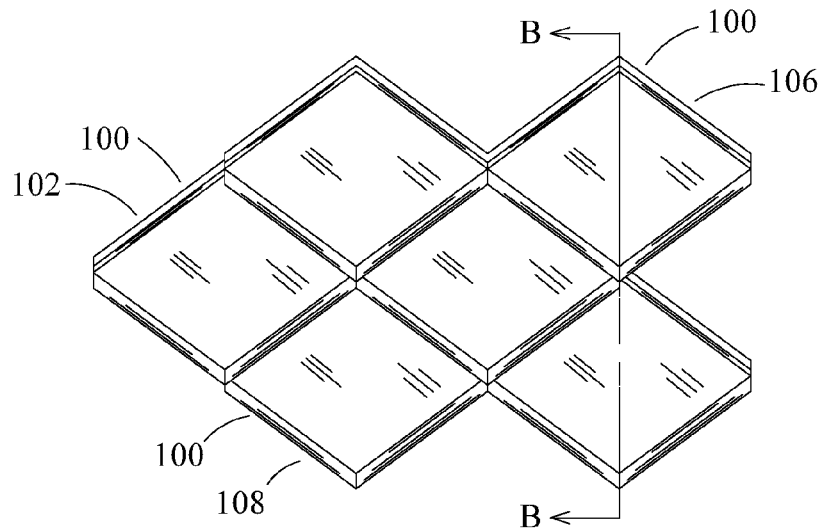
FIG. 11 A is a top view of a group of non-narrowed tiles with normal placement and section line.
Figure 11:
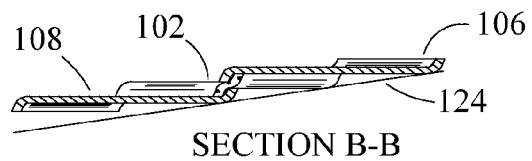
Figure 11:
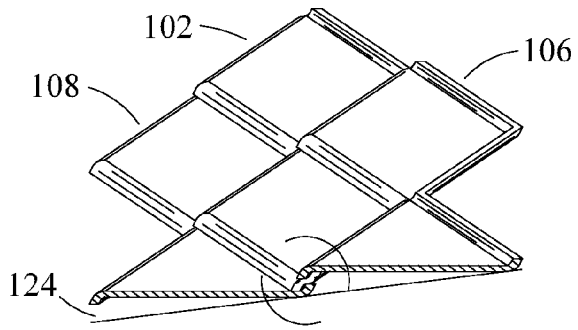
Figure 11:
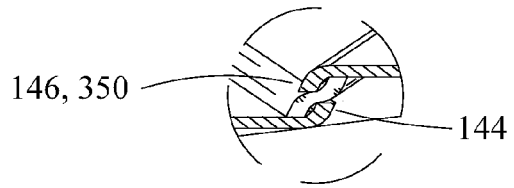

As shown in FIG. 2, FIG. 3 and FIG. 11 B, each tile assembly 110 includes left and right center tiles 102, 104 disposed in a plane nearly parallel to the plane 124 of roof 120. Center tiles 102, 104 are overlapped along their upper regions by an upper tile 106 while a lower tile 108 is positioned beneath the center tiles 102, 104. Each tile 102, 104, 106, 108 has a similar configuration. As shown in FIG. 4, each tile 100 includes at least two generally diamond shaped patterns 112, 114. Each pattern 112, 114 includes a generally diamond shape main surface 130 with upper and lower apices 132, 134 spaced apart along an axis perpendicular or nearly perpendicular to roof line 122. Patterns 112, 114 within each tile 100 are connected to each other and to possibly other patterns in the tile 100 along matching lateral extents of the connecting patterns 116. Main surface 130 of each pattern includes left and right lateral apices 136, 138 spaced apart along an axis nearly parallel to roof line 122. Main surface 130 of each pattern 112, 114 faces outwardly to the environment, including wind, rain, and sun. A diamond shaped pattern effect 120 is produced from the tile assembly 110. When tiles 102, 104, 106, 108 are assembled together as shown in FIGS. 2 & 3, tiles 102, 104, 106, 108 possess a pleasing streamlined appearance.

To enable each tile 102, 104, 106, 108 to connect to adjacent tiles to the left, right, above and below, each pattern 112, 114 on each tile 102, 104, 106, 108 is provided with two upper flanges 140 and two lower flanges 142. Upper flanges 140 incline upwardly and outwardly from main surface 130 at a generally obtuse angle and join together at the upper end of each tile pattern 112, 114 to form an upper flange apex 144. Lower flanges 142 incline downwardly and outwardly from the lower two edges of the main surface 130 at a similar obtuse angle, but in a downward direction. Lower flanges 142 join to form a lower flange apex 146. Upper and lower flanges 140, 142 are generally similar in shape and in height as measured perpendicular to main surface 130, and may differ for aesthetic, roof drainage and structural support purposes.

Each flange 140, 142 extends laterally for a first distance of approximately, for example, one-twentieth to one-half of the transverse width of main surface 130, with the flange extension measured (from a tile top view) in a direction perpendicular to the line made by the main surface 130 and flange 140, 142 intersection. Each flange 140, 142 includes an outer edge 148, which is spaced from and extends generally parallel to main surface 130, and a transition edge 154 152, which extends between outer edges 148 and main surface 130 at lateral apices 136, 138. In one aspect, flanges 140, 142 include a radial contour as they extend out and upward or out and downward, respectively, from main surface 130 of each tile 102, 104, 106, 108.

In one aspect, although at different relative elevations in a direction nearly perpendicular to the plane of the roof, tiles 102, 104, 106, 108 in the tile assembly 110 blend together in a streamline contour that fosters laminar wind flow over the tiles to reduce wind resistance as compared to a tile arrangement in which overlapping flanges are substantially perpendicular to the tile surfaces 130.

Figure 17:
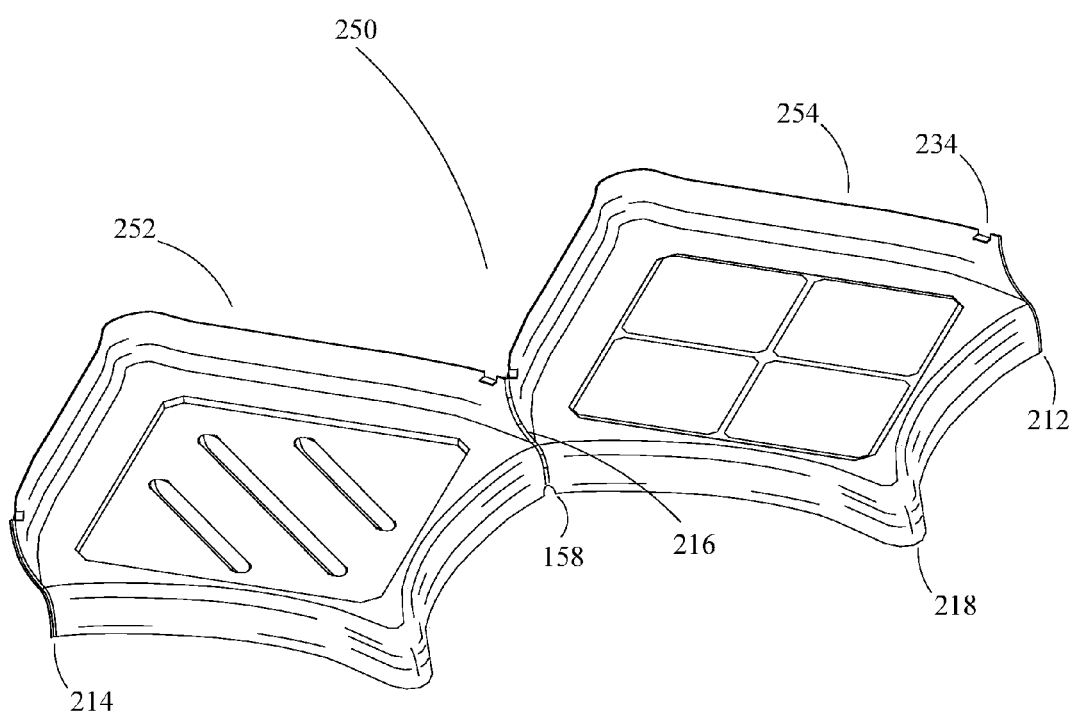
FIG. 17 is a perspective view of a tile with one pattern embedded with solar cell assembly and one pattern ready to be embedded with solar.

Each pattern 112, 114 of the tile 100 is joined 116 to at least one other pattern. The joined parts may have a transition 216, required for some types of manufacturing processes, or for the lip and pan embodiment, as shown in FIG. 7A and FIG. 17. When a transition 216 is needed or desired, extra spacing between tiles is needed to compensate for the space added between the patterns. A wider half pattern at the tiles lateral ends can provide the necessary compensating area. Another method, shown in FIGS. 7A & 7B and FIG. 17, provides the necessary spacing 210 with a lip 212 and pan 214 at the tile lateral ends of the tiles, described in greater detail below. When there is a transition 216 between patterns which requires space between patterns for the transition 216, the lower apexes of upper tiles need to be rounded 218 to compensate for the space between patterns, or the upper tile will have to be moved further down the roof in comparison to the center tiles, providing more overlap and room for the lower apexes to fit.

When tiles 102, 104, 106, 108 are connected together to form tile assembly 110, the inclination of the overlapping flanges of one pattern to the main surface 130 of the overlapped tile below provides a smooth, streamline transition due to the obtuse angles chosen. In one embodiment, the obtuse angle at which each flange extends in relation to the main surface 130 into which it blends is approximately 135 degrees. However, it should be appreciated that other obtuse inclinations may be utilized without departing from the scope of the present invention. For example, obtuse inclinations within a range of approximately 110 to about 165 degrees could be utilized. Within this range of obtuse angles and inclinations, flanges 140, 142 of adjacent tiles may overlap lower tiles, as shown in FIG. 2, to provide a streamline relationship to accomplish a reduced wind resistance and an attractive streamline appearance. These angles are as measured from a straight line between the main surface/flange intersection, to the outer edge of the flange.

Each tile 102, 104, 106, 108 may be formed from various types of materials, such as, for example, rigid materials including fired clay or cement for a thick type or style of tile and metal or steel for a thin type or style of tile. However, each tile 102, 104, 106, 108 may be formed of other materials such as, without limitation, fiberglass reinforced plastic, cement, recycled material, metal or various types of composite materials. In one aspect, an insulating foam backed tile alternate embodiment makes the tile thicker.

As shown in FIGS. 4-6, an inflection edge 150, positioned along each lateral apex 136, 138 of each tile 102, 104, 106, 108, extends perpendicularly to the lateral axis and main surface 130 of each tile 102, 104, 106, 108. Inflection edge 150 includes transition edges 154, 152 of upper 140 and lower 142 flanges, which blend through a radius into main surface 130 to provide a region of inflection between transition edges 154, 152. In one aspect, when tiles 102, 104, 106, 108 are assembled in tile assembly 110, as shown in FIG. 2, adjacent inflection edges 150 of the left and right center tiles 102, 104 are side-by-side in generally abutting relation, ready to be covered by the lower flange apex 146 of upper tile 106. Inflection edges 150 provide an advantage in that, if there is some manufacturing imperfection in the tiles that can create variations or differences between tiles, or if the installer carelessly positions some of the tiles during installation, then inflection edges 150 accommodate enough relative rotational and separation movement of the parts to enable tiles 102, 104, 106, 108 to be assembled despite the misalignment. As will be described in greater detail below, a narrowed tile, as shown, for example, in FIG. 10A, illustrates that tiles can be trimmed along the inflection edges to an extent which allows for tiles to be fit together in tight spaces, while maintaining the essential tile properties.

Figure 7:
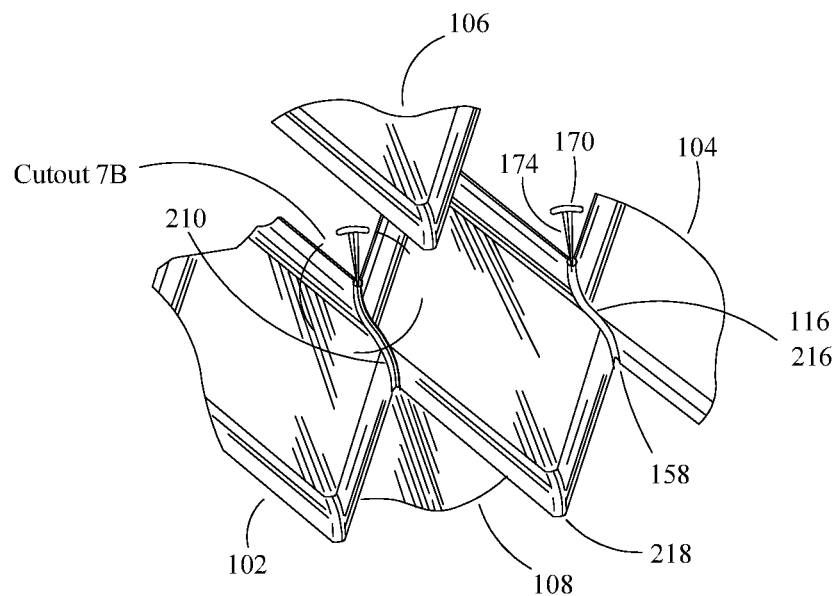
FIG. 7 A is a perspective view of the attachment of tiles to roof via fasteners.
Figure 7:
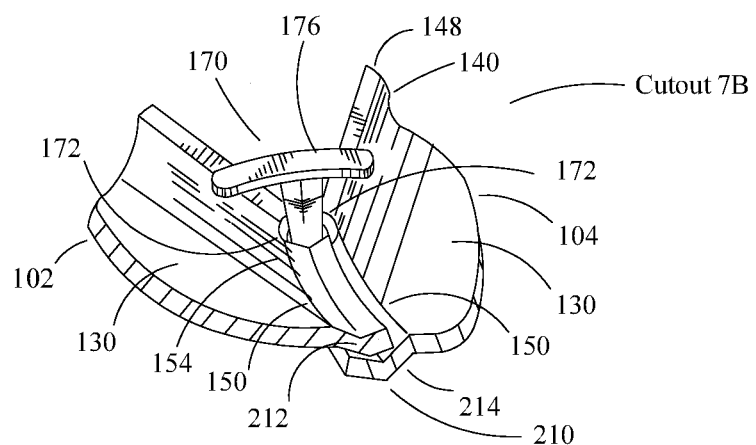

Another embodiment, shown in FIGS. 7A & 7B and FIG. 17, is a lip and pan addition 210, 212, 214 to the inflection edges of two abutting tiles 102, 104. The lip 212 and pan 214 shown in FIG. 7 provide further protection against rain ingress between the center tiles 102, 104 at the inflection edges 150. The lip and pan follow the contour of the inflection edges 150 and provide an impediment to rain fall between the lower transition edges 152 and trapped water at the main surface and upper transition edges 154 of two center tiles 102, 104. The lip and pan arrangement of center tiles 102, 104 also provides a means of redirecting water to the outer surface of lower tile 108. The lip and pan arrangement may require additional space between the inflection edges to allow for the lip and pan to fit together. Each lip and pan arrangement that requires the additional space between inflection edges will also require the same amount of space between adjacent patterns 216 at the junction 116. A tile design which needs the additional space between tiles and patterns for the lip and pan will need to have a lower flange apex that accommodates the wider space between patterns and tiles. This can be accomplished by rounding the lower flange apex or moving the upper tile lower on the roof in comparison to the center tiles in order for the apex to fit and rest on the tiles below. The lip and pan may be formed in a manner that provides a snap together assembly of tiles.

Figure 18:
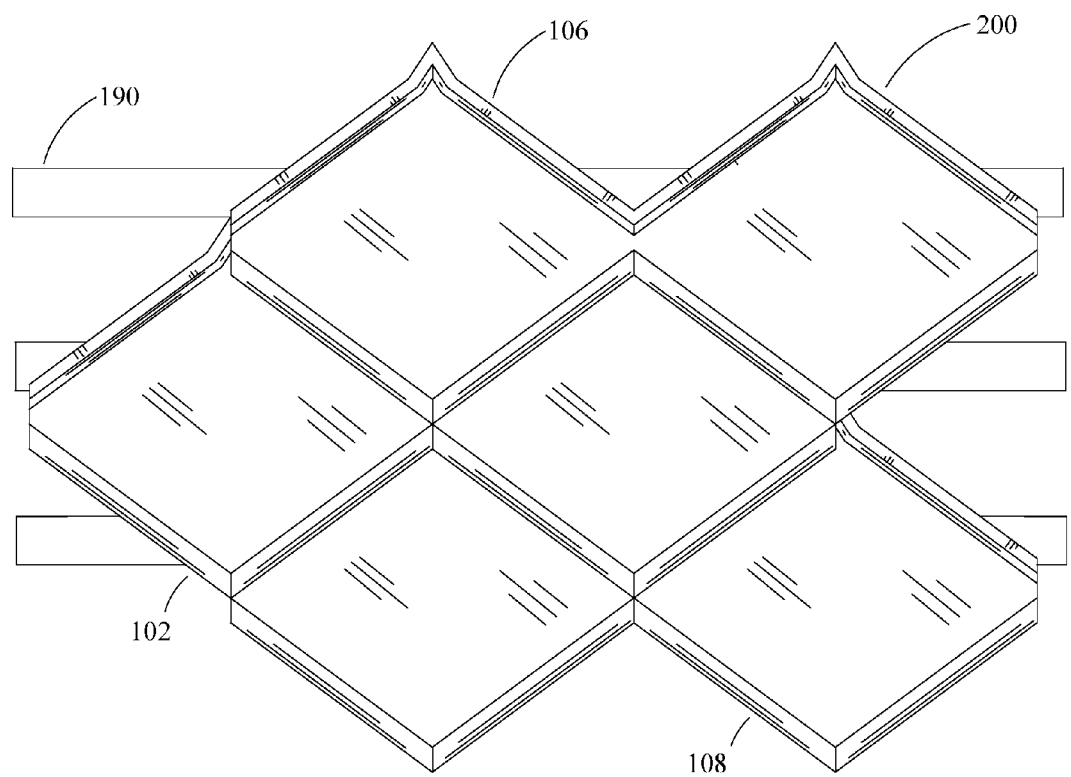
FIG. 18 is a top view of a tile assembly with laths.

In one embodiment, each tile 102, 104, 106, 108 of tile assembly 110 can be secured to the underlying laths 190, as shown in FIG. 18, of roof 120 by fastener 170 shown in FIGS. 7 A & B. In general, these laths 190 are positioned nearly parallel to roof line 122 with similar spacing between each lath 190. Laths 190 are generally utilized for securing tiles, alignment, and added support against weight loads. The spacing of laths 190 from each other is related to the vertical dimensions of the tile to enable attachment. Air movement is free under the tiles when a lath 190 is utilized. It should be appreciated by those skilled in the art that the joined interlocking tiles offer structural support. This is important for some tile variations where the ability to walk on the tile system may be important for maintaining a roof. Laths 190 provide additional support to the tile assemblies 110.

FIGS. 7A & 7B illustrate the attachment of tiles 102, 104, 106, 108 directly to under roof or to laths 190 of roof 120 via fastener 170. In one embodiment, the fastener 170 is a twin headed nail with central nail shaft 174. The head 176 extends in opposite, aligned directions from the top of the shaft. To receive each fastener, upper flanges 140 of each tile 102, 104, 106, 108, in or adjacent to inflected edge 150, is provided with a vertical notch 172, as shown in FIGS. 7A & 7B. The notch may also be placed at pattern to pattern intersection 116 and transition 216 as shown in FIG. 7A. In another embodiment, notches 172 are sufficiently oversized in relation to nail shaft 174 of nail 170 to accommodate misalignments due to structural variations in the dimensions of each tile 102, 104, 106, 108 or minor positioning inaccuracies by the installer installing the fastener 170. In addition, nail 170 can be made with cushioning materials, so that installation does not break tiles 102, 104, 106, 108 during nail installation, such as, for example, a screw with a plastic washer in the shape of the nail head. This type of fastener can be used for brittle tiles, such as cement and clay. Fastener 170 can be anchored directly to roof 120, to a block, to a lath 190, or to a fastening clip.

Fastener 170 and notch 172 may be used in tiles which do not have the 216 extensions to the inflection edges.

When the fastener 170 is driven into position, the double head portions overlie and grip against the edges of upper flanges 140 to securely hold tiles 102, 104 or adjacent patterns 112, 114 within tile 100. Once attached, tiles 102, 104, 106, 108 are less likely to move laterally from nail shaft 174 due to the secure attachment of another nail 170 received in opposing notches 172 on other upper flanges 140. Fasteners 170 may be used on every pattern or just at the lateral extents of the tiles. Head 176 of fastener 170 may also have a softer material, such as, for example, rubber, plastic, or foamed plastic, attached as a washer underneath to absorb shocks from weight loads for brittle tiles. Head 176 of fastener 170 may also have a washer like attachment under head 176 that matches upper inflection edges 150 and, thus, further serves to retain tiles 102, 104, 106, 108 in position. Fasteners may be screws, nails or staples. The washer like attachment may be formed of semi-flexible material, such as, for example, brass, aluminum, plastic or various types of soft alloys. This connector arrangement, coupled with the previously described advantage of inflection edges 150, enables tiles 102, 104, 106, 108 to be installed with some accommodation for variation in tile dimension due to the manufacturing process or misalignment by its installer. The fastener, along with securing and aligning tiles, also improves wind blow-off resistance.

Figure 8:
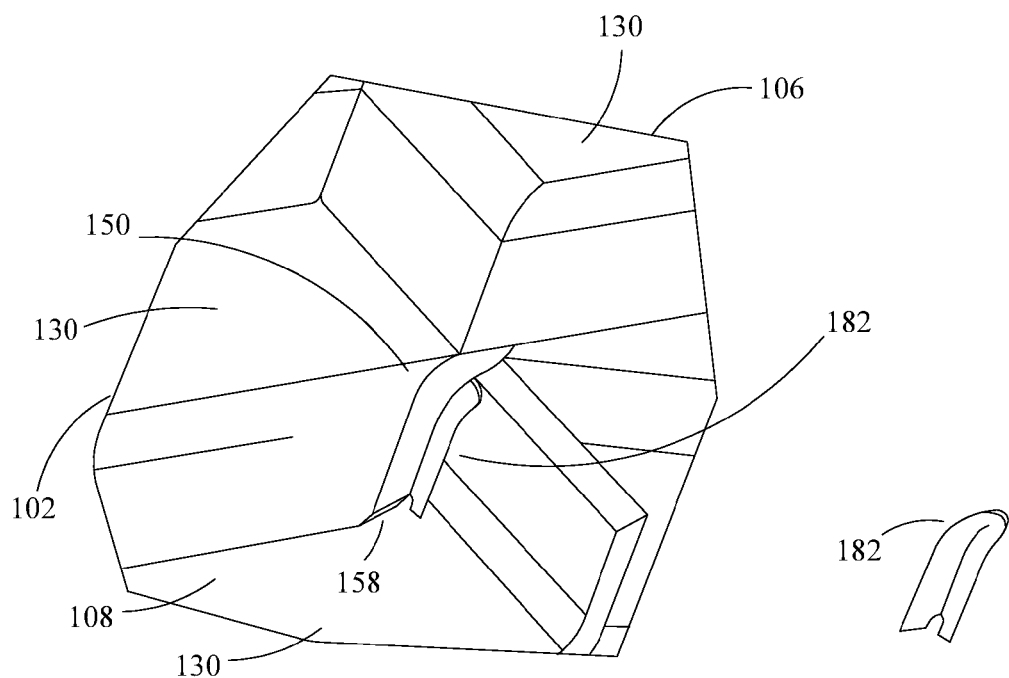
FIG. 8 A is a perspective view of a lower gusset positioned to fit between lower flanges of adjacent tiles.
Figure 8:
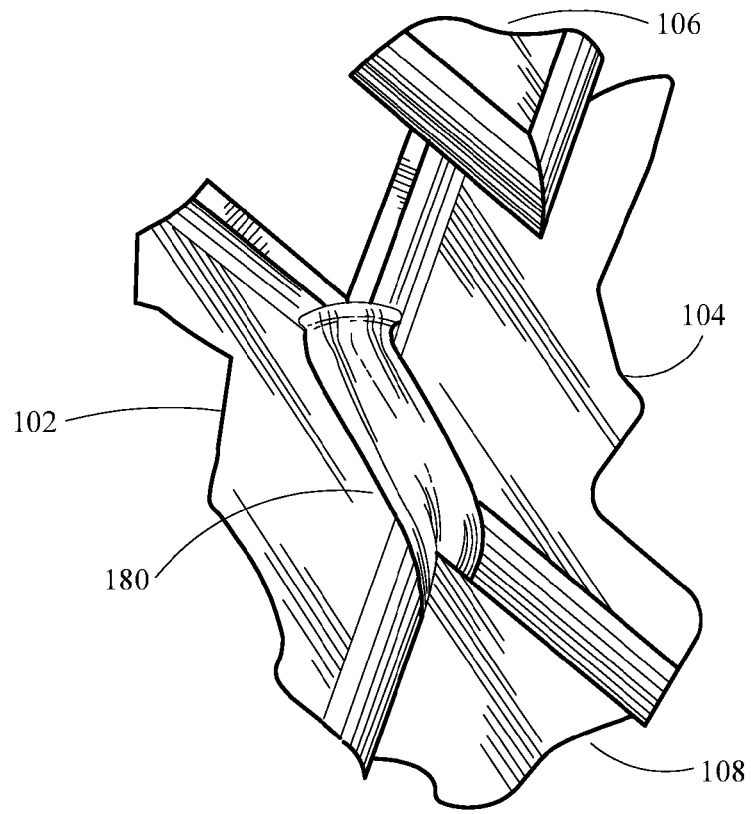

In general, it may be necessary that roof 120 be efficient at shedding water while resisting passage of water through roof 120 between tiles 102, 104, 106, 108 of tile assembly 110. In one aspect, referring to FIG. 2, a potential point of vulnerability to water intrusion is located at the abutting lower transition edges 152, and inflection edges 150, where the left and right center tiles 102, 104 meet. In this area they are exposed to rain and wind because of the streamlined nature of the tile, and the more streamlined a tile is, the more exposed to wind and rain this area will be. A lower gusset 182, as shown in FIGS. 8A & 8B, protects this junction against ingress of water. The upper abutting transition edges 154, and inflection edges 150 are also susceptible to ingress of water. Water flowing in the channel formed by the overlapping tiles on either side of the abutting upper transition edges 154, and inflection edges 150 could deliver water to this area. In one aspect, the upper abutting transition edges 154, and inflection edges 150 act as a dam for this water. Some water in this area that does not move to the outer surfaces of the center tiles could ingress between the tiles at the transition edges 154, and inflection edges 150. An upper gusset 180, as shown in FIG. 8C, is used to protect against ingress of water between the inflection edges 150 in this area. The lip and pan 210 embodiment, shown in FIGS. 7 A & B, also protects both of these areas from water ingress through inflection edges.

FIG. 8A illustrates a lower gusset 182 in a tile assembly 110 with right center tile 104 removed. In one embodiment, lower gusset 182 conforms closely to the angles of the two abutting transition edges 152, and inflection edges 150 and bridges the space between inflection edges to contain and redirect water that comes through the space between them. This water is redirected back by the lower gusset onto the main surface 130 through the abutting transition edges 154, and inflection edges 150 where the inflection edges 150 meet the main surface 130. FIG. 8A shows a notch 158 in the lower flanges at the end of the inflection edges to help in the redirection of water onto the main surface 130 of the tile below. This notch 158 is also placed at the pattern to pattern intersection of lower flanges for improved drainage of the roof 120. The lower gusset 182 also acts to keep the abutting transition edges 152, and inflection edges 150 (and thereby the tiles) together, which acts to reduce or minimize the space between the abutting transition edges 152, and inflection edges 150, thereby reducing or minimizing the ingress of water through the space. In one aspect, at the bottom of the lower gusset 182 is an opening which allows water behind the lower gusset 182 to flow under the lower gusset 182 and out the notch 158 onto the main surface 130.

FIG. 8C illustrates an upper gusset 180 positioned so as to overlap the space between abutting inflection edges 150 of adjacent tiles 102, 104. In one embodiment, upper gusset 180 inhibits the passage of water between inflection edges 150 of adjacent center tiles 102, 104. Upper gusset 180, which may be molded from various types of suitable water impervious, moldable, stiff, thin, material, such as, for example, plastic, rubber, composite material, brass or the like is shaped to fit over and extend the length of the inflection edges 150 of adjacent tiles 102, 104. Upper gusset 180 can be placed in position by the installer at the time of installation. In one aspect, upper gusset 180 may be shorter than shown in FIG. 8C, not covering the lower inflection edges 150 and not visible when tiles 102, 104, 106, 108 are assembled.

In use and operation, the installer can proceed along roof 120, securing tiles 102, 104, 106, 108 of tile assembly 110 to the laths 190, or directly to roof 120 in a continuous sequence of overlapping tiles, whereby each tile 102, 104, 106, 108 can form at least part of tile assembly 110. Thus, roof 120 can include numerous groupings of four tile assemblies 110 disposed to cover the roof so no openings for rain to directly fall on the under roof exist. In one aspect, each tile 100 on the assembled roof 120 includes tiles 102, 104, 106, 108 as a group with additional groups of tiles surrounding it. In one aspect, the overall effect is to provide an attractive, diamond shaped pattern roof 120 having a streamline appearance, which is aesthetically attractive, and which contributes to reduced wind resistance. The relationship of overlapping flanges 140, 142 is also intended to provide for efficient drainage of water from the surface of roof 120 and to reduce intrusion of water through it. Also, inclusion of inflection edges 150 and oversized nail installation apertures 172 permit installation despite structural variations of tiles 102, 104, 106, 108 in the manufacturing process and inaccuracies of alignment by the installer.

Figure 10:
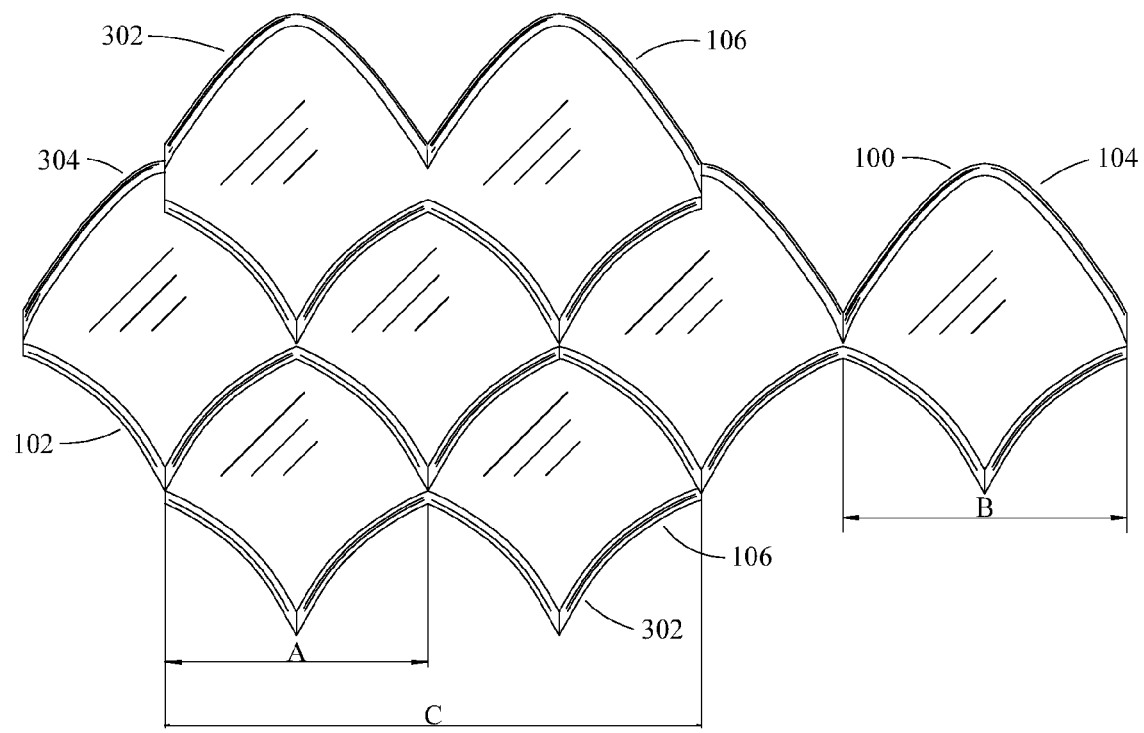
FIG. 10 A is a top view of narrowed tiles placed with non-narrowed tiles, with width dimension.
Figure 10:
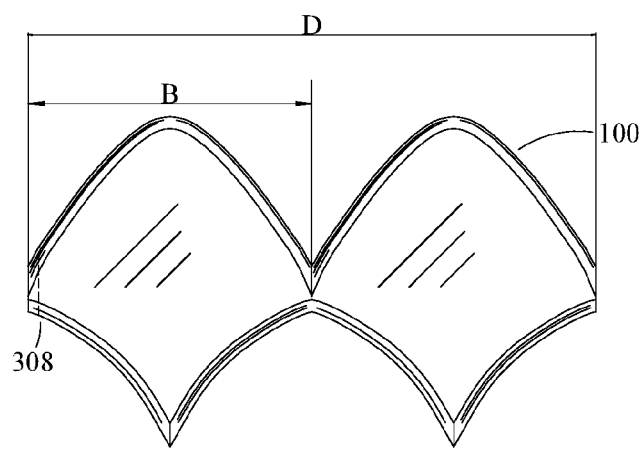

FIG. 10A illustrates tiles assembled together, with tiles 302, 304 having some of their inflection edges closer to the vertical centerline of patterns as compared to the other tiles 100 in FIGS. 10A & B. One advantage of utilizing narrowed tiles 302, 304 for a tile assembly is that a narrowed tile can fit into a horizontally smaller roof space, thereby allowing the tile system to be fit into a smaller area. FIG. 10 A shows narrowed tiles 302, 304 width dimension for comparison with FIG. 10 B non-narrowed tile 100 width dimension. It can be readily seen that the narrowed tiles 302, 304 are narrower than tile 100. In this type of application narrowing of the tile on one side only can be done. Tile 302 is narrowed on the left pattern and tile 304 is narrowed on the right pattern. Narrowed tiles affect all the other tiles in the vertical column of tiles, which means in a direction perpendicular to the roof line 122, and all tiles in the column will need to be narrowed. The narrowing of tiles can be used to fit tiles onto a rounded roof, by making the upper portion of tile narrower than the lower portion of the tile.

In one aspect, width of narrowed tile 302 can be as formed by effectively shaving tile 100 along the inflection edges 150 on each side of the tile to form new inflection edges 308 parallel to the original inflection edges, as shown in FIG. 10 B.

Figure 12:
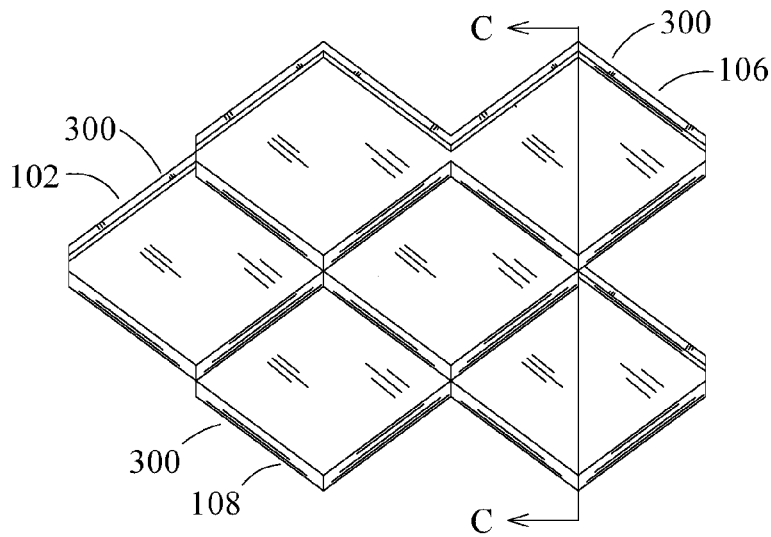
FIG. 12 A is a top view of a group of narrowed tiles with normal placement and section line.
Figure 12:
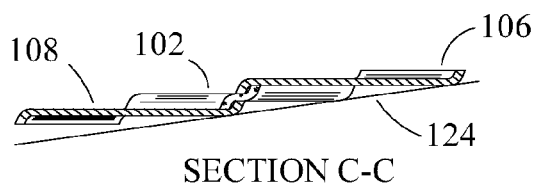
Figure 12:
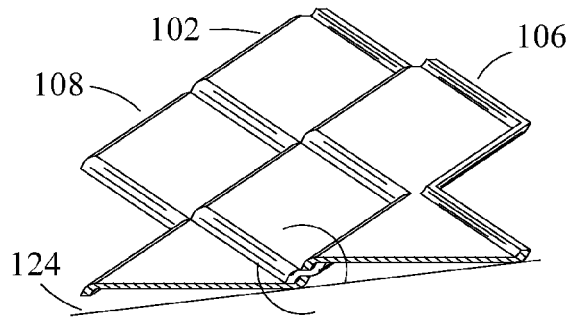
Figure 12:
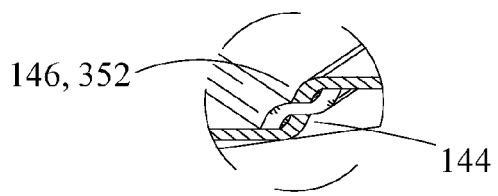

Narrowed tiles 302, 304, 300 have different characteristics than non-narrowed tiles and may be used for the entire roof, as shown in FIGS. 12 A,B,C & D for tiles 300. This type of narrowing would make all the patterns in tile 300 the same width. Further narrowing of these narrowed tiles may be done to fit some of them into narrower spaces. Narrowed tiles 300 reduce the effects of wind on roof 120 as compared with non-narrowed tiles 100. FIGS. 12 A,B,C & D shows this characteristic of narrowed tile 300 allowing the lower flange apex 146 352, which is directly above the two lower inflection edges of two abutting tiles to rest on these tiles and not overhang them. This allows wind to flow in a smooth contour.

FIGS. 11 A,B,C & D show non-narrowed tiles having a lower flange 146, 350 apex which protrudes over the inflection edges of the tiles below. FIGS. 12 A,B,C & D show narrowed tiles of approximately the same size as those of FIG. 11 A, but with no protruding apex 146, 352. The narrowing of tiles provides reduced obstruction to the smooth flow of air flow over the tiles. Thicker tiles of the same roof area as a thin tile will have a larger tip and would protrude more than the tip of a thin tile. The larger the amount of overlap of protruding apex 146 over the tiles and patterns below, the more it impedes the smooth flow of air over the tile assemblies and roof 120.

Narrowed tiles are not as efficient in rain shedding as non-narrowed tiles, because the lower tile 108 upper flange apex catch basin does not underlap the inflection edges above it as much as non-narrowed tiles do. This can be seen in the narrowed tiles of FIGS. 12 C & D, which have less area of upper apex 144 under the inflection edges than the non-narrowed tiles of FIGS. 11 C & D have. Thicker tiles have a better catch basin effect than thin tiles, due to the greater amount of underlap of the upper flange apex.

In one aspect, the closeness of abutting lower inflection edges 150 of center tiles 102, 104 and the use of the lower gusset 182, the upper gusset 180, and the lip and pan 212, 214 reduce rain penetration. The pattern to pattern inflection edges do not have the same vulnerability to water passing through them and enhance the rainproofness of the tile system. In high rain and wind conditions, when the tiles 102, 104, 106, 108 are structurally imperfect, placed improperly on the roof, or the roof deck is uneven, rain water may penetrate and travel behind imperfectly abutting lower flanges 142 of center tiles 102, 104. This water can flow in the channel made by the overlapping lower over upper flanges of the two tiles towards the two abutting upper inflection edges 150 at the lower end of the channel. In this instance, the trapped water can flow out onto the exposed outer tile surfaces or pass through the upper transition edge intersection 154 and be caught by upper flange apex 144 of another lower tile 108. Should this process of penetrated water that runs in the channels behind lower flanges 142 combine with other trapped water, and then continue to flow in the channels, the amount of trapped water at any one of the upper flange inflection edge intersections can significantly increase. There can be a large enough amount of trapped water, depending on tile thickness and roof angle, that can overwhelm the basin characteristic of the upper flange apex 144 of the lower tile 108. In general, the thinner the tile and the flatter the roof, the more susceptible a given tile design will be. Narrowed tiles are also more susceptible to having an insufficient amount of upper flange apex 132 under the abutting center tiles 102, 104 than non-narrowed tiles. However, the present invention overcomes these problems by having multiple patterns, using gussets 182, 180, using the lip and pan 212, 214, and using the following embodiments listed as four features.

Figure 13:
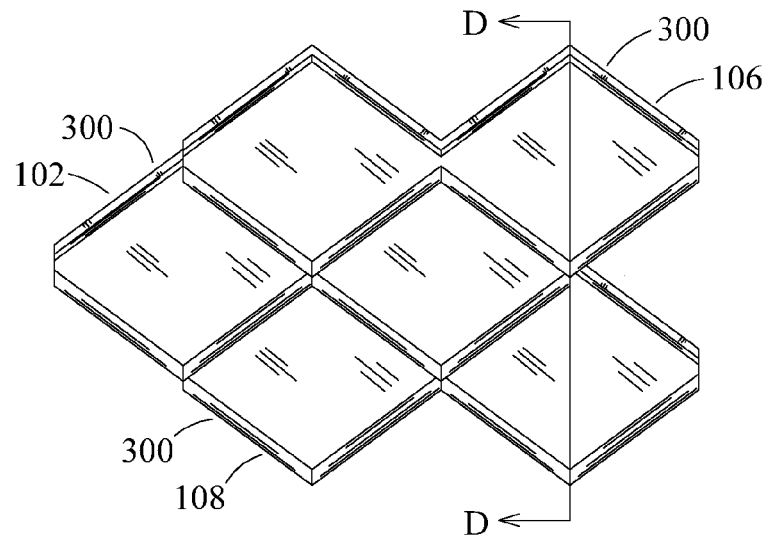
FIG. 13 A is a top view of a group of narrowed tiles with additional overlap by placement, and section line.
Figure 13:
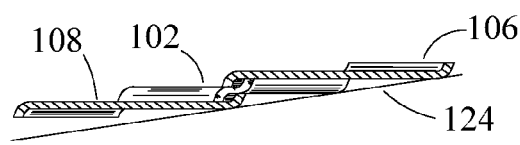
Figure 13:
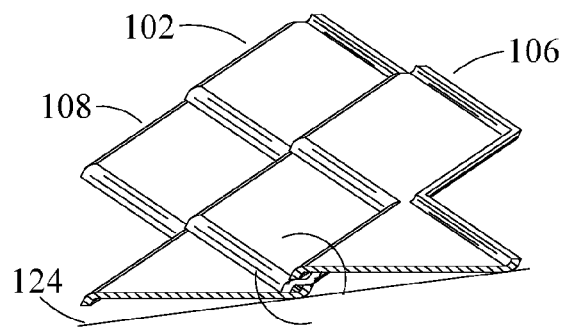
Figure 13:
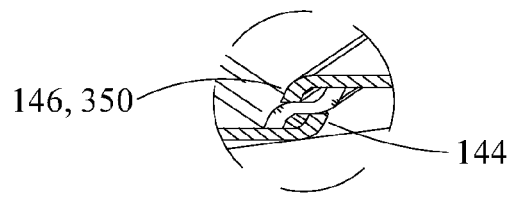
Figure 14:
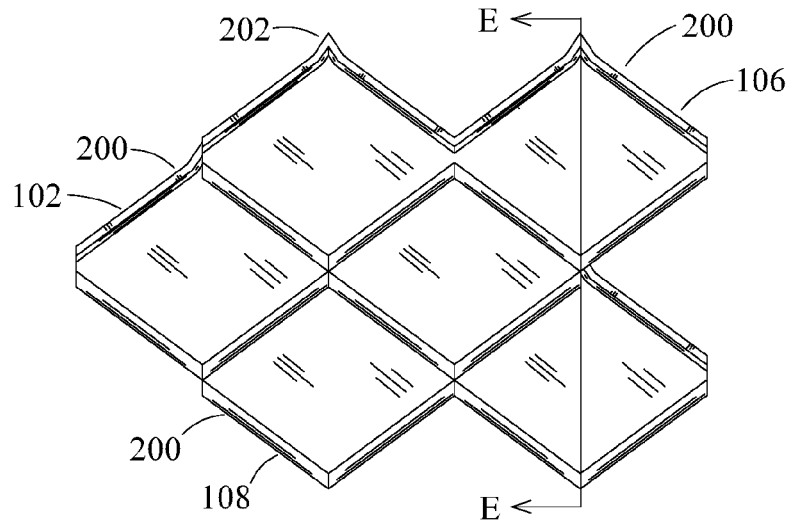
FIG. 14 A is a top view of a group of narrowed tiles with extended upper apex, normal placement and section line.
Figure 14:
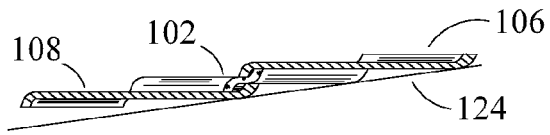
Figure 14:
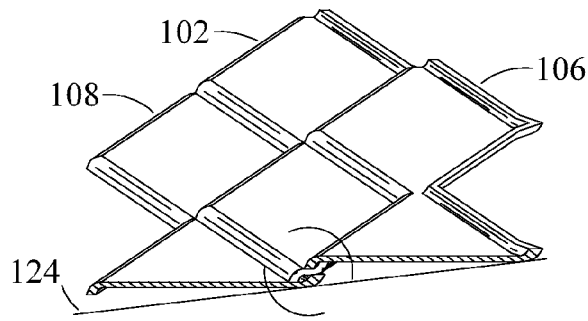
Figure 14:
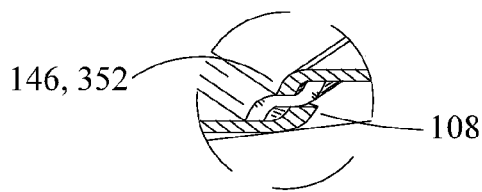

The first alternate embodiment feature shown in FIGS. 14 A, B, C & D, illustrates an embodiment of a tile 200 that provides an extension or extended basin 202 of upper flange at apex 144, and includes a general deformation of the apex of the upper flanges in the direction up the roof. This improves the underlying basin characteristic of the upper flange apex 144 under the inflection edges 150. The second alternate embodiment feature, is shown in FIG. 5 and in the dimension comparison, the upper half of tile 100 is longer than the bottom half, through a generally smaller angle of the upper apex (shown as rounded in FIGS. 4,5 & 6). The third alternate embodiment feature makes the upper flanges flare out more from the main surface thereby increasing the upper half length compared to the lower half. The fourth alternate embodiment feature is illustrated with the narrowed tile 300 and shown in FIGS. 13 A,B,C & D, and which is an increase in the amount of overlap of each row over the next lower row. Using the increased overlap placement shown in FIGS. 13 A,B,C & D provides a larger amount of underlying catch basin 144 under the center tiles at upper transition edges 154, and inflection edge 150 as compared with the normal tile placement of the narrowed tiles shown in FIGS. 12 A,B,C & D. For the increased overlap placement tiles, the lower flange apex tip 146, 350 is protruding over the adjacent transition edges 152 more, which is more impeding to the smooth flow of air. The tile assembly with more overlap also has a slightly different look. The first three features described do not affect the finished look of the roof. A roof that uses some tiles that are narrowed will have to take into account the effect that narrowing a tile has on rainprofness and windproofness in the tile assemblies 110 in the vicinity of the narrowing. Overcoming the decreased rainproofness with local amelioration, such as using an upper gusset may be done. Providing all tiles on a roof with enough upper flange apex catch basin to accommodate the narrowing of some tiles is another method of compensating for the effect of the narrowed tiles on rainproofness. It should be appreciated by those skilled in the art that these four alternate embodiment features or methods may be used in combination.

Figure 9:
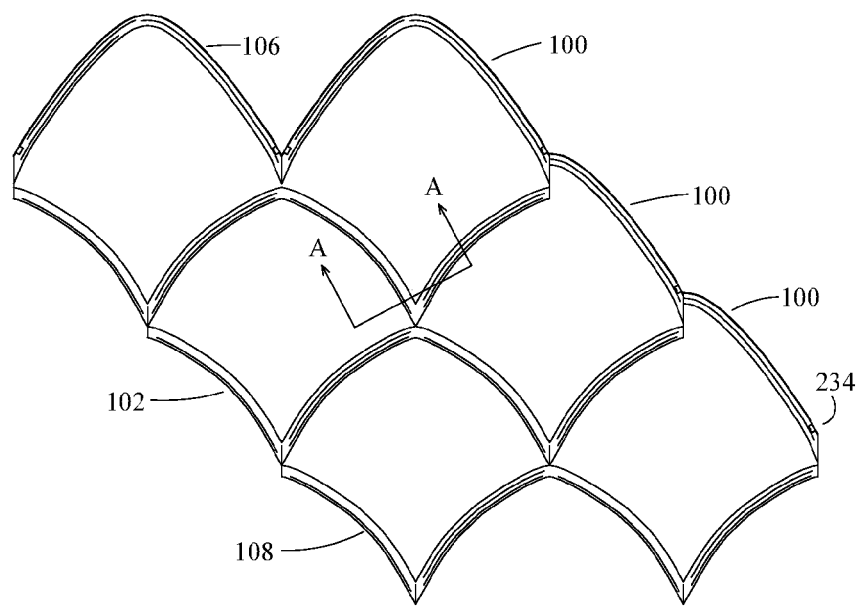
FIG. 9 A is a top view of a group of tiles with a section line on one of the tiles.
Figure 9:
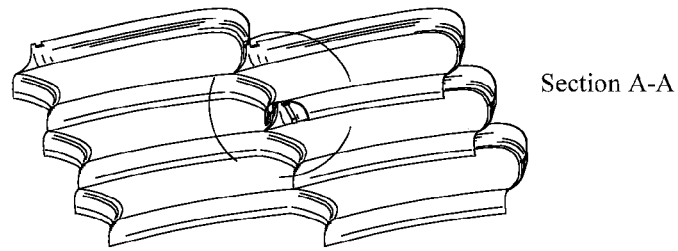
Figure 9:
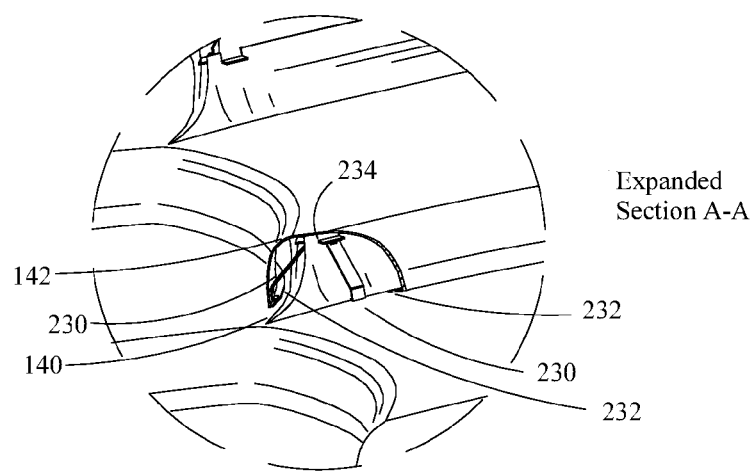

An alternate embodiment to improve wind and blow off resistance uses a flexible link 230, along with holds on tiles as shown in FIGS. 9 A,B & C. The flexible link fits between holds in the channel between lower flanges 142 of the upper tile 106 and upper flange 140 of one of the center tiles 102, 104. The flexible link 230 extends between a hold 232 on the lower flange and a hold 234 on the upper flange and the flexible yet stiff nature of the link provides a spring movement between the holds, keeping the upper tile in place against the center tiles.

The hold down on the lower flanges of an upper tile may consist of an extending fold on a sheet metal tile or an indentation on a thick tile, this extension (or indentation) serving as the means of securing one end of the flexible link to the hold. The hold down on the upper edges of the center tile is a bend on part of the upper flange for thin metal tiles or an indentation for a thick tile. It is understood that other forms of attaching the link between these two flanges will constitute the holds. The flexible link in a basic form is a strip of flexible yet stiff material which will bend between the opposing forces on the two flanges. The flexible strip provides a spring type of action on the tiles to keep them in place. If the flexible strip is secured in the tile system with some of the spring action in force, the hold down serves to keep the tiles from moving. This type of arrangement may be used to make a snap together type of assembly. A fastener assembly may be used to hold the tiles to the roof and act as the hold down clip, and would be the hold on the upper edges of the center tile. The type of hold down can vary as long as both ends of the flexible strip are held to oppose the force of lifting the tiles off the roof. The flexible link does not have to be absolutely fixed to one of the flanges. For thick tiles, indentations or ledges in the surfaces can serve as the holds which keep the hold down clip in place.

In another embodiment of the hold down, one flexible strip may hold two lower flanges of the upper tile against two upper flanges of two center tiles or patterns, and be used with a fastener. When the flexible link is part of the fastener assembly, the fastener can be moved up the roof relative to the upper inflection edges, and a notch 172 in the inflection edges for the fastener may not be needed.

In one aspect, the tiles edges can be joined together with the main surfaces in a tight fitting configuration with very little space between edges and between edges and main surfaces. The overlapping and underlapping flanges provide a double row of structural support. The underlapping and overlapping flange structural support feature provides resistance to weight loads in snow conditions and in roof installation and maintenance. The multiple patterns of tile 100 provide for a more structurally supportive roof and therefore, better support for weight loads. The weight load resistance can be further enhanced with the use of the lath 190 for multiple rows of tiles and tile assembly.

Figure 15:
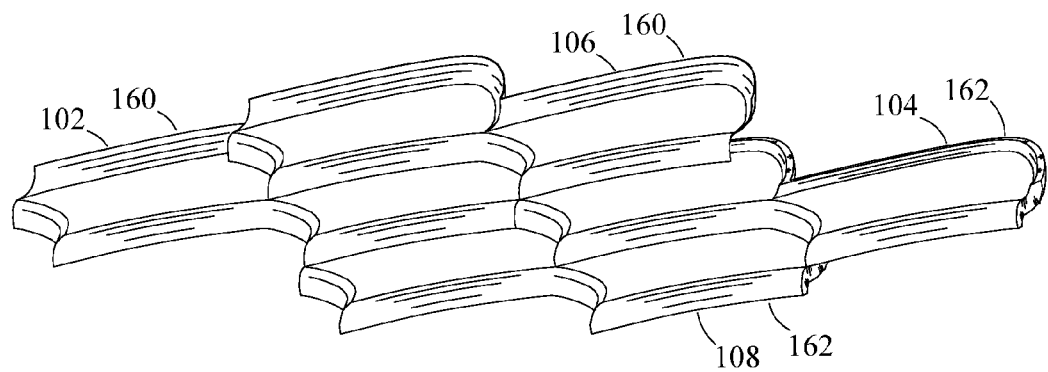
FIG. 15 is a perspective view of thick and thin tiles assembled together.

In another aspect, the tile assembly 110, as described herein, can make use of thick materials such as clay and cement, and also thin materials such as metal and composites. It should be appreciated by those skilled in the art that tiles 102, 104, 106, 108 for tile assembly 110 can include multiple materials for more choice in selecting roof materials and features, such as weight of a tile system, and weight of a tile system with a snow load. Moreover, thin and thick tiles 102, 104, 106, 108 in tile assembly 110 could be positioned next to each other on the same roof 120, as illustrated in FIG. 15. Some trimming of the thin tile upper edges will be needed on some of the tiles.

In still another aspect, this tight fitting feature may provide additional protection for roof 120 in the form of resistance to fire embers due to the tight fitting assembly of tiles 102, 104, 106, 108 of tile assembly 110. The more patterns in a tile 100, the fewer the potential points of ingress there are to fire embers.

In one embodiment, insulation may be molded to fit under a number of tiles to make up an assembly of tiles, with or without an embedded lath, with assembly being attached to the subroof. The assemblies may fit together closely to provide an insulated roof with an associated installation labor savings.

Figure 16:
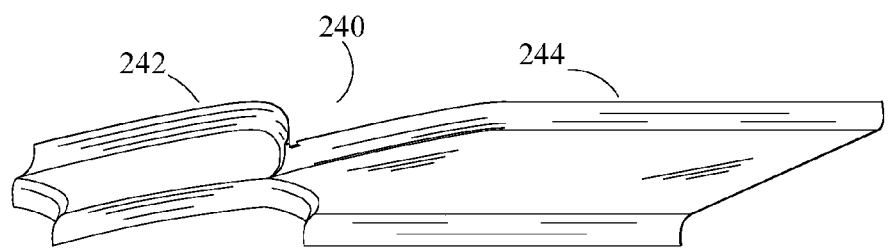
FIG. 16 is a perspective view of a tile with a modified pattern.

In an alternative embodiment, as shown in FIG. 16, a tile may have one of its patterns modified to allow for trimming as in the case of roof edges, hips and valleys or for an alternative look or transition to allow a different type of pattern to form.

In one embodiment, the tiles may have solar cells embedded into them or coated onto them through various manufacturing techniques, an example of which is shown in FIG. 17. The lead conductors of the solar cell(s) are brought out through the bottom of the flat surface of the tiles. The leads are then connected to the solar array wiring network.

While the description above refers to particular embodiments of the present invention, it will be understood that many modifications may be made without departing from the spirit thereof. In some instances, for aesthetic reasons, these modifications can take the form of tiles which change shape to make a pattern that involves multiple tiles. The accompanying claims are intended to cover such modifications as would fall within the true scope and spirit of the present invention.

The presently disclosed embodiments are therefore to be considered in all aspects as illustrative and not restrictive, the scope of the invention being indicated by the appended claims, rather than the foregoing description, and all changes which come within the meaning and range of equivalency of the claims are therefore intended to be embraced therein.

What is claimed is:

1. A tile assembly for installation on a roof comprising: a plurality of tiles each having a matching, laterally repeating pattern;
    wherein each pattern has one main surface with upper and lower vertical apices and left and right lateral apices; wherein the main surface of each pattern is flat throughout; wherein each pattern has two upper flanges extending peripherally directly from the main surface between the upper apex and lateral apices;
    wherein each pattern the two upper flanges extend directly from the main surface at an obtuse angle in a first direction;
    wherein each pattern the two upper flanges meet at an upper flange apex;
    wherein each pattern has two lower flanges extending peripherally directly from the main surface between the lower apex and lateral apices;
    wherein each pattern the two lower flanges extend directly from the main surface at an obtuse angle in a second direction;
    wherein each pattern the two lower flanges meet at a lower flange apex; and wherein at least two inflection edges at the lateral apices of each tile extending perpendicularly to a lateral axis of the tile, and the main surface of each pattern on the tile;
    at least two inflection planes positioned along the lateral apices of each pattern, extending perpendicularly to a lateral axis of the pattern and the main surface of the pattern; wherein at least one inflection plane from each pattern transitions along the inflection plane to another matching inflection plane of another laterally positioned pattern;
    wherein the plurality of tiles includes a left and right center tile positioned so as to abut at the adjacent outer inflection edges of each tile;
    wherein the plurality of tiles includes an upper tile positioned with two lower flanges from one of its patterns directly overlapping the two adjacent upper flanges of the left and right center tiles; and wherein the plurality of tiles includes a lower tile positioned with two upper flanges from one of its patterns directly underlying the two adjacent lower flanges of abutting left and right center tiles;
    characterized in that each flange includes an outer edge parallel to the pattern main surface and a radial contour; and each inflection plane is defined by, transition planes of the upper and lower flanges and an adjacent portion of the lateral extent of the main surface, wherein said transition planes extend between the outer edges of the upper and lower flanges and the main surface at the lateral extent of the pattern and wherein said transition planes bend via radiused regions from the main surface to extend in opposite, generally parallel directions, to provide an inflected configuration, and where at each lateral extent of the tile, the inflection plane is also an inflection edge and comprises the transition planes of the upper and lower flanges which extend between the flanges outer edges and the main surface and includes the adjacent main surface edge.

2. The tile assembly of claim 1, wherein the tile assembly is adapted for installation on a roof extending in a plane inclined downwardly from a roof line of the roof and, when installed on the roof in multiplicity, defines a diamond patterned roof.

3. The tile assembly of claim 1, wherein each tile has a similar configuration, has at least two repeating patterns and, wherein each tile at least two generally diamond shaped main surfaces are disposed in a plane nearly parallel to the plane of the roof.

4. The tile assembly of claim 1, wherein the upper and lower vertical apices of each pattern of the tile are spaced along an axis nearly perpendicular to a roof line of the roof and the left and right lateral apices of each pattern are spaced along an axis nearly parallel to the roof line.

5. The tile assembly of claim 1, wherein the upper flange outer edges of each pattern are joined at an upper flange apex.

6. The tile assembly of claim 1, wherein the lower flange outer edges of each pattern are joined at a lower flange apex.

7. The tile assembly of claim 5, wherein for each pattern, the obtuse angle at which each of the flanges is inclined to the main surface is about 135 degrees measuring from the top of the main surface where it intersects the flange to the outer edge of the flange, and using the shortest line possible.

8. The tile assembly of claim 5, wherein for each pattern, the obtuse angle at which each of the flanges is inclined to said main surface is within a range of about 120 degrees to about 160 degrees.

9. The tile assembly of claim 1, wherein each tile pattern includes a notch in one or more of its upper flanges in the transition planes thereof.

10. The tile assembly of claim 1, wherein a tile pattern includes a notch at the end of each lower flange at the transition plane.

11. The tile assembly of claim 1, further comprising a plurality of fasteners each having a head that overlaps two of the patterns of the tiles or two adjacent tiles, and a fastener shaft extending from the fastener head, wherein any of the tiles patterns may include a notch in each of its upper flanges in the transition plane and any contiguous pattern to pattern transition, and sized to receive the fastener shaft, and wherein at least the center tiles are secured to the roof by the fasteners inserted through the notches in the upper flanges of the center tiles.

12. The tile assembly of claim 11, wherein the fastener further comprises semi-flexible material beneath the head that conforms to the contour of the inflection planes.

13. The tile assembly of claim 1, further comprising a lower gusset provided under the transition edges of the adjacent lower flanges of the center tiles and on top of the upper flange apex of the lower tile, wherein the lower gusset is formed of a water impervious material and the lower gusset includes an opening at a bottom portion of the lower gusset.

14. The tile assembly of claim 1, wherein the tiles are formed of plastic, cement, metal, composites, or clay.

15. The tile assembly of claim 1, wherein for each pattern, the distance between the middle of the pattern and the upper apex is longer than the distance between the middle of the tile and the lower apex.

16. The tile assembly of claim 1, wherein for each pattern, the upper flanges are larger than the lower flanges, and where both the lower and upper flange extend an equal distance as measured perpendicular to the main surface.

17. The tile assembly of claim 1, further comprising solar cells embedded in the tiles or coated on the tiles.

18. The tile assembly of claim 1, wherein at least one of the upper and lower flanges includes a straight section which is at an obtuse angle with the main surface and the radial contour.

19. The tile assembly of claim 1, wherein for a pattern, a flexible strip of stiff material is inserted between a hold on an upper flange of a center tile and a hold on a lower flange of an upper tile positioned directly over the center tile, with holds acting with flexible strip to keep upper tile from lifting away from center tile by the spring action of the flexible strip between the holds;

and wherein flexible strip of stiff material may be part of a fastener assembly.

20. The tile assembly of claim 1, wherein at the lateral extents of each tile, an addition is made to the inflection edges, consisting of: for a first lateral extent of the tile, a downward sloping edge along most of the inflection edge; for a second lateral extent of the tile, a complementary edge with downturn and upturn which matches and fits under the downward sloping edge of the first lateral extent, to provide a blockage to water falling between the inflection edges of two center tiles and a means of redirecting water out to the exposed main surface of the lower tile below.

21. The tile assembly of claim 1, wherein at the lateral extents of one or more patterns, one or more of the inflection edges are made with an increased length and are parallel or nearly parallel to the upper and lower vertical apices, and the main surface portion of the inflection edge is increased, with main surface providing support for the lower flange apex of the upper tile to rest directly on it.

22. The tile assembly of claim 1, with one of the patterns being a lateral extension of the lateral extent of the first pattern, and wherein the second pattern is different from the first pattern.

23. A tile assembly for a diamond patterned roof, for installation on a roof extending in a plane inclined downwardly from the roof line, the tile assembly comprising: two, left and right center tiles, each tile having a generally diamond shaped repeating pattern each pattern having a main surface disposed in a plane nearly parallel to the roof plane and having upper and lower vertical apices spaced along an axis perpendicular to the roof line and left and right lateral apices spaced along an axis parallel to said roof line, wherein each pattern has six sides in a plan view and the main surface is flat throughout;

each pattern having two upper flanges extending peripherally directly from the pattern main surface between its upper apex and its lateral apices, each upper flange extending upwardly and outwardly at an obtuse angle in a first direction from the main surface and having an outer edge parallel to the main surface and a transition plane extending between the outer edge and the main surface at the lateral extent of the pattern, the upper flange outer edges being joined at an upper flange apex;

each pattern having two lower flanges extending peripherally directly from the pattern main surface between its lower apex and its lateral apices, each lower flange extending downwardly and outwardly at an obtuse angle in a second direction from the main surface and having an outer edge parallel to the main surface and a transition plane extending between the outer edge and the main surface at the lateral extent of the pattern, and the lower flange outer edges being joined at a lower flange apex;

each pattern having two inflection planes, positioned at the lateral ends of each pattern, each inflection plane defined by the transition planes of the upper and lower flanges and an adjacent portion of the main surface, each inflection plane extending in a plane generally perpendicular to the main surface, wherein adjacent patterns within a tile are continuous to each other at their adjacent inflection planes, and may have a transition along the matching inflection planes;

each patterns inflection planes end at the beginning of the inflection planes of the next lateral patterns on both sides or end where a transition is made between lateral patterns, with the transition being continuous to the abutting patterns, or the pattern ends at the lateral end of the tile;

at each lateral end of the tile, the pattern inflection plane is also an inflection edge and includes the edge made by the transition planes of the upper and lower flanges and the adjoining main surface edge, an upper tile having the same configuration as each of said center tiles and that is positioned with two of its lower flanges of a pattern overlapping the two adjacent upper flanges of two center tiles; and a lower tile having the same configuration as each of the center tiles and that is positioned with two of its upper flanges of a pattern underlying the two adjacent lower flanges of two center tiles.

24. A tile comprising:

at least two repeating lateral patterns with each pattern having a generally diamond shaped main surface with upper and lower vertical apices spaced apart along a vertical axis and left and right lateral apices spaced apart along a horizontal axis, wherein the main surface is flat throughout and the pattern has six sides in a plan view;

each pattern having two upper flanges extending peripherally directly from the pattern main surface between its upper apex and its lateral apices, each upper flange extending upwardly and outwardly at an obtuse angle in a first direction from the pattern main surface and having an outer edge parallel to the main surface and a transition plane extending between the outer edge and the main surface, the upper flanges being joined at an upper flange apex;

each pattern having two lower flanges extending peripherally directly from the pattern main surface between its lower apex and its lateral apices, each lower flange extending downwardly and outwardly at an obtuse angle in a second direction from the main surface and having an outer edge parallel to the main surface and a transition plane extending between the outer edge and the main surface, the lower flanges being joined at a lower flange apex;

each pattern having two inflection planes positioned at the lateral ends of each pattern, each inflection plane defined by the transition plane of the upper and lower flanges and an adjacent portion of the main surface, each inflection plane extending in a plane generally perpendicular to the main surface;

the generally diamond shaped main surface and flanges may be curved as seen from the plan view;

the inflection planes at the lateral ends of the tile will also be inflection edges, defined by the transition edges of the upper and lower flanges and the adjacent portion of the main surface edge.

* * * * *